(12) United States Patent
Sievers-Engler

(10) Patent No.: US 11,300,548 B2
(45) Date of Patent: Apr. 12, 2022

(54) LIQUID CHROMATOGRAPHY SYSTEMS

(71) Applicant: Roche Diagnostics Operations, Inc., Indianapolis, IN (US)

(72) Inventor: Adrian Sievers-Engler, Muensingen (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 215 days.

(21) Appl. No.: 16/892,787

(22) Filed: Jun. 4, 2020

(65) Prior Publication Data
US 2021/0003541 A1    Jan. 7, 2021

(30) Foreign Application Priority Data

Jul. 1, 2019 (EP) ..................................... 19183598

(51) Int. Cl.
*G01N 30/38* (2006.01)
*G01N 30/24* (2006.01)
(Continued)

(52) U.S. Cl.
CPC ......... *G01N 30/38* (2013.01); *B01D 15/1871* (2013.01); *B01D 15/1885* (2013.01);
(Continued)

(58) Field of Classification Search
CPC .. G01N 30/38; G01N 30/24; G01N 2030/027; G01N 2030/385; G01N 2030/8804; B01D 15/1871; B01D 15/1885
See application file for complete search history.

(56) References Cited

U.S. PATENT DOCUMENTS 4,724,081 A * 2/1988 Kawahara .......... B01D 15/1814
                                                         210/659
6,344,172 B1   2/2002 Afeyan et al.
(Continued)

FOREIGN PATENT DOCUMENTS

| JP | H07-229885 A | 8/1995 |
|---|---|---|
| WO | 2005/024412 A1 | 3/2005 |
| WO | 2010/026742 A1 | 3/2010 |

OTHER PUBLICATIONS

European search opinion for related case 19183598, dated Dec. 16, 2019.*

(Continued)

*Primary Examiner* — Benjamin L Lebron
(74) *Attorney, Agent, or Firm* — Roche Diagnostics Operations, Inc.

(57) ABSTRACT

A liquid chromatographic (LC) system is introduced which comprises at least one fluidic stream, the fluidic stream comprising a sample-injection valve, a trap-bypass-selection valve, a column-bypass valve, a load-elute valve and a trap-selection valve. Also, a liquid chromatographic (LC) system is introduced which comprises at least one fluidic stream. The fluidic stream comprises a first substream and a second substream. The first substream comprises a first sample-injection valve, a load-elute valve and a trap-selection valve. The second substream comprises a second sample-injection valve and a column-bypass valve. The fluidic stream further comprises a trap-LC substream transfer valve and a substream-selection valve. The LC systems provide a broad choice of chromatographic options and modes and enable to flexibly and rapidly switch between them.

14 Claims, 21 Drawing Sheets

(51) Int. Cl.
  *G01N 30/02* (2006.01)
  *G01N 30/88* (2006.01)
  *B01D 15/18* (2006.01)

(52) U.S. Cl.
  CPC ....... *G01N 30/24* (2013.01); *G01N 2030/027* (2013.01); *G01N 2030/385* (2013.01); *G01N 2030/8804* (2013.01)

(56) References Cited

U.S. PATENT DOCUMENTS

| | | | |
|---|---|---|---|
| 6,955,760 B2* | 10/2005 | Iwata | G01N 30/462 |
| | | | 210/101 |
| 7,566,395 B2* | 7/2009 | Lundblad | G01N 30/82 |
| | | | 210/659 |
| 2011/0167898 A1* | 7/2011 | Zhou | G01N 30/24 |
| | | | 73/61.55 |
| 2012/0145617 A1 | 6/2012 | Lee et al. | |
| 2013/0306535 A1 | 11/2013 | Yamazaki | |
| 2018/0231510 A1 | 8/2018 | Yamazaki et al. | |
| 2018/0292368 A1 | 10/2018 | Franz et al. | |

OTHER PUBLICATIONS

Japanese notice of refusal for related case 2020111169, dated Jan. 12, 2022.*

* cited by examiner

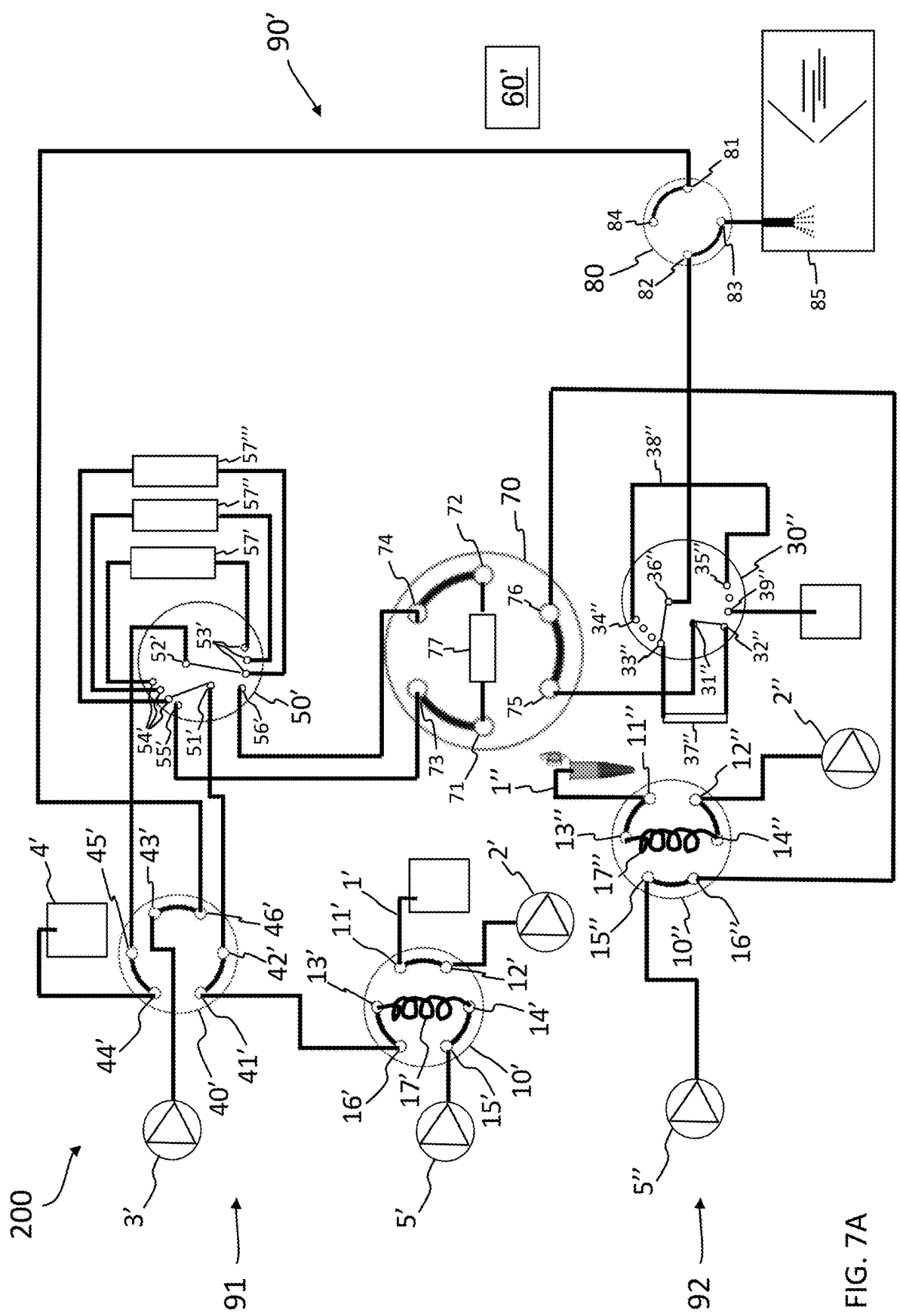

LIQUID CHROMATOGRAPHY SYSTEMS

CROSS-REFERENCE TO RELATED APPLICATIONS

This application claims priority to European Patent Application No. 19183598.2, filed 1 Jul. 2019, the disclosure of which is hereby incorporated by reference in its entirety.

FIELD OF THE DISCLOSURE

The present disclosure is related to liquid chromatographic systems enabling switching between different analytical modes.

BACKGROUND

There is growing interest for the implementation of mass spectrometry and more specifically of liquid chromatography coupled to mass spectrometry in the clinical laboratory. However, the lack of standardized and automated procedures and the complexity of the analytical setup limit its implementation. In particular, sample preparation is typically a manual and tedious procedure. Protein precipitation with subsequent centrifugation is the most popular method to remove unwanted and potentially disturbing sample matrix. The use of kits may in part facilitate sample preparation that can be at least in part automated. Kits are however available only for a limited number of analytes of interest and the entire process from sample preparation, to separation and detection remains complex, requiring the attendance of highly trained laboratory personnel to run highly sophisticated instruments.

Also, typically, a batch approach is followed, where a batch of samples prepared in advance under the same preparation conditions undergo consecutive chromatographic separation runs under the same separation conditions. This approach however does not enable high throughput and is not flexible, e.g., does not allow processing samples in random order and does not allow re-scheduling (changing a pre-defined processing sequence) in view for example of incoming emergency samples that have higher priority and have to be processed first.

For high-throughput applications requiring many consecutive sample injection cycles, and especially for random-access analysis of different samples possibly requiring different injection conditions and different LC separation conditions, even more flexibility and speed in quickly changing and adapting the conditions for each sample in a scheduled sequence, is important.

SUMMARY

It is against the above background that the embodiments of the present disclosure provide certain unobvious advantages and advancements over the prior art. In particular, the inventors have recognized a need for improvements in liquid chromatography systems.

Although the embodiments of the present disclosure are not limited to specific advantages or functionality, it is noted that the present disclosure allows for liquid chromatographic (LC) systems to provide a broad choice of chromatographic options and modes and to flexibly and rapidly switch between them without hardware modifications, without manual intervention and without significant loss of throughput, which is typically due to otherwise long re-equilibration times.

In accordance with one embodiment of the disclosure, a liquid chromatographic (LC) system comprising at least one fluidic stream is provided, the fluidic stream comprising: a sample-injection valve comprising a plurality of ports and a multi-way switch to switch fluidic connections between ports, including a sample input port fluidically connected to a sample input nozzle, an aspiration/dispensing-pump port fluidically connected to a sample aspiration pump, a sample-loop-input port and a sample-loop-output port interconnected by a sample loop, an LC-pump port fluidically connected to an LC pump and a sample-injection-to-trap-bypass-selection port; a trap-bypass-selection valve comprising a plurality of ports and a multi-way switch to switch fluidic connections between ports, including a trap-bypass-selection-to-sample-injection port fluidically connected to the sample-injection-to-trap-bypass-selection port of the sample injection valve, two bypass ports interconnected by a bypass fluidic path, a trap-bypass-selection-to-column-bypass port and two trap-bypass-selection-to-load-elute ports; a column-bypass valve comprising a plurality of ports and a multi-way switch to switch fluidic connections between ports, including a column-bypass-to-trap-bypass-selection port fluidically connected to the trap-bypass-selection-to-column-bypass port of the trap-bypass-selection valve, at least one pair of LC-columns ports interconnected by an LC analytical column, two bypass ports interconnected by a bypass fluidic path and an analytical output port; a load-elute valve comprising a plurality of ports and a multi-way switch to switch fluidic connections between ports, including two load-elute-to-trap-bypass-selection ports fluidically connected to the trap-bypass-selection-to-load-elute ports respectively of the trap-bypass-selection valve, an LC-pump port fluidically connected to an LC pump, a waste port fluidically connected to a waste, and two load-elute-to-trap-selection ports; a trap-selection valve comprising a plurality of ports and a multi-way switch to switch fluidic connections between ports, including two trap-selection-to-load-elute ports fluidically connected to the load-elute-to-trap-selection ports respectively of the load-elute valve, at least one pair of trap-column ports interconnected by a trap column.

In accordance with another embodiment of the disclosure, a liquid chromatographic (LC) system is provided comprising at least one fluidic stream, the fluidic stream comprising a first substream and a second substream, the first substream comprising: a first sample-injection valve comprising a plurality of ports and a multi-way switch to switch fluidic connections between ports, including a sample input port fluidically connected to a sample input nozzle, an aspiration/dispensing-pump port fluidically connected to a sample aspiration pump, a sample-loop-input port and a sample-loop-output port interconnected by a sample loop, an LC-pump port fluidically connected to an LC pump and a sample-injection-to-load-elute port; a load-elute valve comprising a plurality of ports and a multi-way switch to switch fluidic connections between ports, including a load-elute-to-sample-injection port fluidically connected to the sample-injection-to-load-elute port of the first sample-injection port, an LC-pump port fluidically connected to an LC pump, a waste port fluidically connected to a waste, an analytical output port and two load-elute-to-trap-selection ports; a trap-selection valve comprising a plurality of ports and a multi-way switch to switch fluidic connections between ports, including two trap-selection-to-load-elute ports fluidically connected to the load-elute-to-trap-selection ports respectively of the load-elute valve, at least one pair of trap-column ports interconnected by a trap column, and two trap-selection-to-trap-LC-transfer ports. The second substream comprises: a second sample-injection valve comprising a plurality of ports and a multi-way switch to switch fluidic connections between ports, including a sample input port fluidically connected to a sample input nozzle, an aspiration/dispensing-pump port fluidically connected to a sample aspiration pump, a sample-loop-input port and a sample-loop-output port interconnected by a sample loop, an LC-pump port fluidically connected to an LC pump and a sample-injection-to-trap-LC-transfer port; a column-bypass valve comprising a plurality of ports and a multi-way switch to switch fluidic connections between ports, including at least one pair of LC-columns ports interconnected by an LC analytical column, two bypass ports interconnected by a bypass fluidic path, an analytical output port, and a column-bypass-to-trap-LC-transfer port. The fluidic stream further comprises: a trap-LC substream transfer valve comprising a plurality of ports and a multi-way switch to switch fluidic connections between ports, including one pair of trap-column ports interconnected by a trap column, two trap-LC-transfer-to-trap-selection ports fluidically connected to the two trap-selection-to-trap-LC-transfer ports respectively of the trap-selection valve, a trap-LC-transfer-to-column-bypass port fluidically connected to the column-bypas s-to-trap-LC-transfer port of the column-bypass valve and a trap-LC-transfer-to-sample-injection port fluidically connected to the sample-injection-to-trap-LC-transfer port of the second sample injection valve; a substream-selection valve comprising a plurality of ports and a multi-way switch to switch fluidic connections between ports comprising a substream-selection-to-load-elute port fluidically connected to the analytical output port of the load-elute valve, a substream-selection-to-column-bypass port fluidically connected to the analytical output port of the column-bypass valve, and a substream-selection-analytical-output port.

These and other features and advantages of the embodiments of the present disclosure will be more fully understood from the following detailed description taken together with the accompanying claims. It is noted that the scope of the claims is defined by the recitations therein and not by the specific discussion of features and advantages set forth in the present description.

BRIEF DESCRIPTION OF THE DRAWINGS

The following detailed description of the embodiments of the present disclosure can be best understood when read in conjunction with the following drawings, where like structure is indicated with like reference numerals and in which:

FIG. 7A shows schematically the same LC system of FIG. 5A in a first switch status of an LC mode;

Figure 1A:
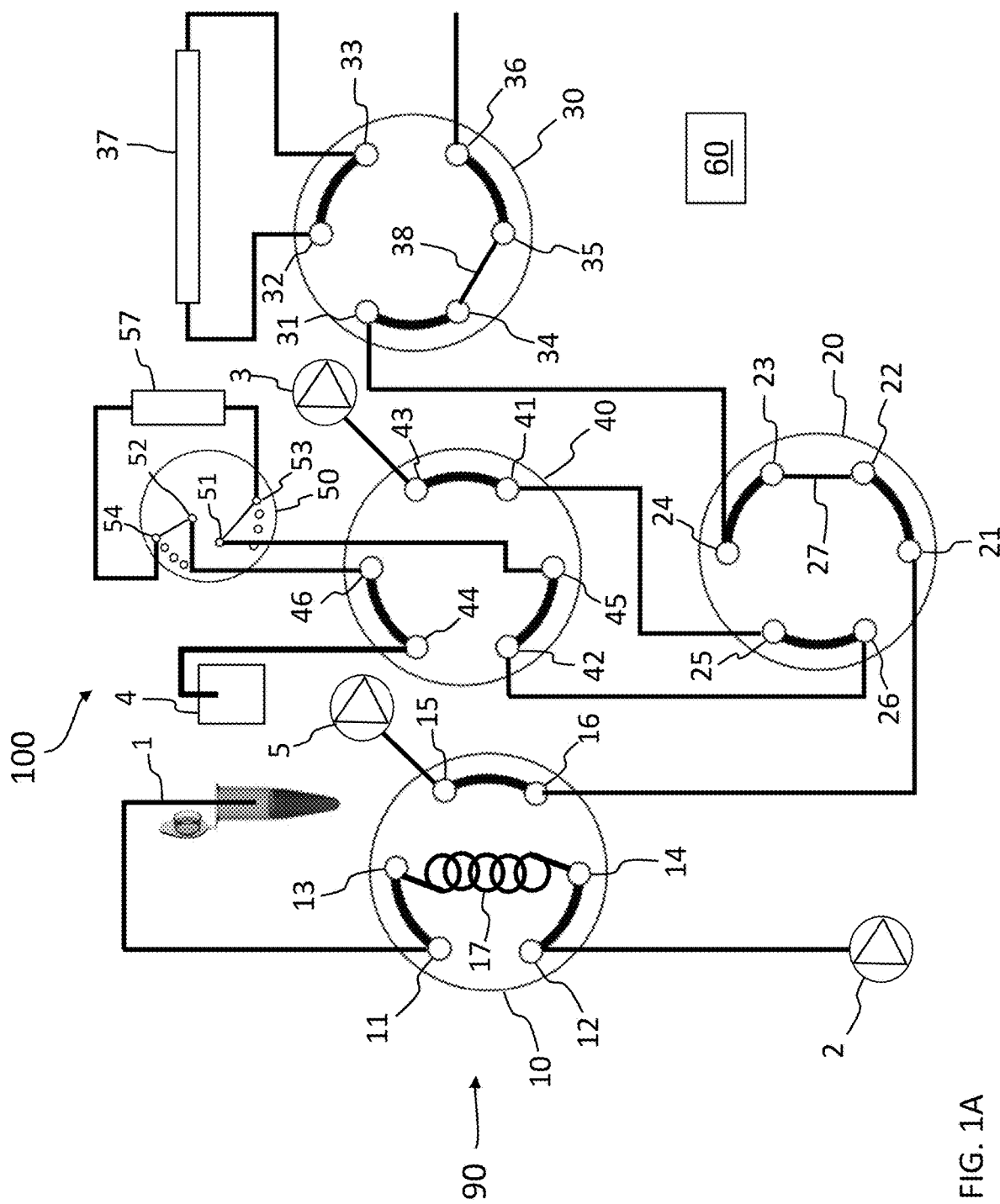
FIG. 1A shows schematically a first LC system according to a first embodiment of the present disclosure in a first switch status of a continuous-flow-infusion/dilute-shoot mode.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiments of the present disclosure.

DETAILED DESCRIPTION

A first liquid chromatographic (LC) system is introduced which comprises at least one fluidic stream, the fluidic stream comprising a sample-injection valve, a trap-bypass-selection valve, a column-bypass valve, a load-elute valve and a trap-selection valve. The sample-injection valve comprises a plurality of ports and a multi-way switch to switch fluidic connections between ports, including a sample input port fluidically connected to a sample input nozzle, an aspiration/dispensing-pump port fluidically connected to a sample aspiration pump, a sample-loop-input port and a sample-loop-output port interconnected by a sample loop, and an LC-pump port fluidically connected to an LC pump and a sample-injection-to-trap-bypass-selection port.

The trap-bypass-selection valve comprises a plurality of ports and a multi-way switch to switch fluidic connections between ports, including a trap-bypass-selection-to-sample-injection port fluidically connected to the sample-injection-to-trap-bypass-selection port of the sample injection valve, two bypass ports interconnected by a bypass fluidic path, a trap-bypass-selection-to-column-bypass port and two trap-bypass-selection-to-load-elute ports. The column-bypass valve comprises a plurality of ports and a multi-way switch to switch fluidic connections between ports, including a column-bypass-to-trap-bypass-selection port fluidically connected to the trap-bypass-selection-to-column-bypass port of the trap-bypass-selection valve, at least one pair of LC-columns ports interconnected by an LC analytical column, two bypass ports interconnected by a bypass fluidic path and an analytical output port.

The load-elute valve comprises a plurality of ports and a multi-way switch to switch fluidic connections between ports, including two load-elute-to-trap-bypass-selection ports fluidically connected to the trap-bypass-selection-to-load-elute ports respectively of the trap-bypass-selection valve, an LC-pump port fluidically connected to an LC pump, a waste port fluidically connected to a waste, and two load-elute-to-trap-selection ports. The trap-selection valve comprises a plurality of ports and a multi-way switch to switch fluidic connections between ports, including two trap-selection-to-load-elute ports fluidically connected to the load-elute-to-trap-selection ports respectively of the load-elute valve, at least one pair of trap-column ports interconnected by a trap column.

"Liquid chromatography or LC" is an analytical process that subjects samples injected by a sample injector to chromatographic separation through an LC column in order for example to separate analytes of interest from matrix components, e.g., remaining matrix components after sample preparation that may still interfere with a subsequent detection, e.g., a mass spectrometry detection, and/or in order to separate analytes of interest from each other in order to enable their individual detection. "High-performance liquid chromatography" or HPLC, "ultra-high-performance liquid chromatography" or UHPLC, including "micro liquid chromatography" or µLC and "small-bore liquid chromatography" or small-bore LC are forms of liquid chromatography performed under pressure.

A "liquid chromatographic system or LC system" is an analytical apparatus or module or a unit in an analytical apparatus for carrying out liquid chromatography. The LC system may be embodied as a single channel or as a multi-channel system that may comprise one or a plurality of LC columns arranged in parallel and/or in series. The LC system may also comprise elements such as a sample injector, valves, liquid sources, fluidic connections and part, e.g., for mixing liquids, degassing liquids, tempering liquids, and the like, one or more sensors, such as pressure sensors, temperature sensors and the like, and especially at least one LC pump. The list is not exhaustive. According to an embodiment, the LC system is an analytical module designed to prepare a sample for mass spectrometry and/or to transfer a prepared sample to a mass spectrometer, in particular for separating analytes of interest before detection by a mass spectrometer. In particular, typically, during an LC run, the mass spectrometer may be set to scan a specific mass range. LC/MS data can be represented by adding up the ion current in the individual mass scans and plotting that "totaled" ion current as an intensity point against time.

The resulting plot looks like an HPLC UV trace with analyte peaks. The LC system may otherwise comprise a detector of its own such as a UV detector.

The term "liquid" refers to liquids commonly used in liquid chromatography, e.g., as solvents or mixtures of solvents used, e.g., as mobile phases or eluents and as known in the art.

The term "sample" refers to a biological material suspected of containing one or more analytes of interest and whose detection, qualitative and/or quantitative, may be associated to a clinical condition. The sample can be derived from any biological source, such as a physiological fluid, including, blood, saliva, ocular lens fluid, cerebral spinal fluid, sweat, urine, milk, ascites fluid, mucous, synovial fluid, peritoneal fluid, amniotic fluid, tissue, cells or the like. The sample can be pretreated prior to use, such as preparing plasma or serum from blood, diluting viscous fluids, lysis or the like; methods of treatment can involve filtration, centrifugation, distillation, concentration, inactivation of interfering components, and the addition of reagents. A sample may be used directly as obtained from the source in some cases or following a pretreatment and/or sample preparation workflow to modify the character of the sample, e.g., after adding an internal standard, after being diluted with another solution or after having being mixed with reagents, e.g., to enable carrying out one or more in vitro diagnostic tests, or for enriching (extracting/separating/concentrating) analytes of interest and/or for removing matrix components potentially interfering with the detection of the analyte(s) of interest. Examples of analytes of interest are vitamin D, drugs of abuse, therapeutic drugs, hormones, and metabolites in general. The list is however not exhaustive.

A "fluidic stream" is a fluidic path through which liquids can flow and in particular through which a sample from a sample injection point can be transferred to a detector, e.g., to a mass spectrometer or other detector, and through which the sample may undergo a chromatographic process. The fluidic connection through different parts of the fluidic stream may be discontinuous. This is because the fluidic stream comprises elements such as switching valves that may establish alternative connections and regulate fluidic flow between different parts of the fluidic stream at different times. An "LC channel" is a fluidic line, part of the fluidic stream, comprising at least one capillary tubing and/or LC column comprising a stationary phase selected according to the type of sample(s) and analytes of interest and through which a mobile phase is pumped in order to trap and/or separate and elute and/or transfer analytes of interest under selected conditions, e.g., according to their polarity or log P value, size or affinity, as generally known. The at least one LC column in the at least one LC channel may be exchangeable. In particular, the LC system may comprise more LC columns than LC channels, where a plurality of LC columns may be selectable, e.g., interchangeably coupled to the same LC channel. Capillary tubing may be also used to bypass LC columns. A fluidic stream may comprise a plurality of substreams.

The LC system may comprise a plurality of fluidic streams connected to a stream-selection valve for directing one fluidic stream at a time to a detector.

An "LC column" may refer to any of a column, a cartridge, a capillary and the like for performing separations of a chromatographic nature. Columns are typically packed or loaded with a stationary phase, through which a mobile phase is pumped in order to trap and/or separate and elute and/or transfer analytes of interest under selected conditions, e.g., according to their polarity or log P value, size or affinity, as generally known. This stationary phase can be particulate or beadlike or a porous monolith. However, the term "column" may also refer to capillaries which are not packed or loaded with a stationary phase but rely on the surface area of the inner capillary wall to effect separations. The LC column may be exchangeable and/or operate in parallel or in sequence to one or more other LC columns. An LC column may be for example a rapid trap and elute LC column or "trap-column" for short, a high-performance LC (HPLC) column or an ultra-high-performance LC (UHPLC) column, and may be of any size, including micro-LC columns and small-bore LC columns with an inner diameter of 1 mm or less. In the case of trap-columns, a stationary phase is chosen that retains analytes of interest whereas any salts, buffer, detergents and other matrix components are unretained and washed away. This process is typically followed by elution of the analytes, e.g., in back flush mode, with a different mobile phase or a solvent gradient. Depending on the analytes, separation of some analytes may be expected in some cases. On the other hand, in case of analytes having identical masses (isobaric) and/or overlapping daughter ion spectra in multiple reaction monitoring (MRM), when it comes to mass spectrometry, a more extensive chromatographic separation might be preferable. In that case separation in a HPLC or UHPLC column may be advantageous.

A "liquid chromatography pump or LC pump" is a high-pressure pump that may vary in pressure capacity but that can yield a consistent and reproducible volumetric flow rate through an LC channel. Pressure in HPLC may typically reach as high as 60 MPa or about 600 atmospheres, whereas UHPLC and µ-LC systems have been developed to work at even higher pressures, e.g., up to 140 MPa or about 1400 atmospheres, and therefore are able to use much smaller particle sizes in the LC columns (<2 µm). LC pumps may be configured as binary pumps, e.g., in case of conditions requiring the use of elution gradients.

According to one embodiment, the LC pump can yield a pressure of 60 MPa to 140 MPa, e.g., 75 MPa to 100 MPa, e.g., 80 MPa.

According to one embodiment, the LC pump can be configured to operate with a flow rate between 1 µl/min and 500 µl/min or more, and typically operate at flow rates between 100 µl/min and 300 µl/min and an accuracy of, e.g., about ±5% or less.

The LC pumps in accordance with at least one embodiment of the present LC system may have dedicated functions or multiple functions. For example, the LC pump fluidically connected to the LC-pump port of the sample-injection valve may be the same as the LC pump connected to the LC-pump port of the load-elute valve via, e.g., an additional switch valve, in order to connect to either the sample-injection valve or to the load-elute valve at a time.

An "LC switching valve" is a multi-port valve that controls flow between elements connected to the ports. This is typically achieved by a switch mechanism that moves one or more valve conduits to switch communication between different elements. Elements may be fluidically connected to the ports via further conduits, like pipes, tubes, capillaries, microfluidic channels and the like and by fittings like screws/nuts and ferrules, or alternative liquid-tight sealings, e.g., maintained in place by a clamp mechanism. An LC switching valve is normally capable of allowing liquid pressures in the order of magnitude used for HPLC or higher.

According to an embodiment, the switch valve has an inner valve conduit(s) with an inner diameter of less than 0.6 mm, e.g., between about 0.5 mm and 0.2 mm, e.g., about 0.4 mm or about 0.25 mm.

According to an embodiment, the switch valve has a switching time of about 500 ms or less.

The sample-injection valve, the trap-bypass-selection valve, the column-bypass valve, the load-elute valve and the trap-selection valve are LC switching valves.

According to an embodiment, the column-bypass valve is an LC-column selection valve to select between HPLC or UHPLC columns and comprising a plurality of pairs of LC-column ports, where each pair can be interconnected by a HPLC or UHPLC column.

For example, the column-bypass valve may be a 2-7 Ways, 6/8/10/12/14 port valve and the HPLC or UHPLC columns may be of the same or different type/selectivity.

According to the same or alternative embodiment, the trap-selection valve is a trap-column selection valve to select between trap-columns and comprising a plurality of pairs of trap-column ports, where each pair can be interconnected by a trap-column.

For example, the trap-selection valve may be a 2-7 Ways, 6/8/10/12/14 port valve and the trap columns may be of the same or different type/selectivity.

The "column-bypass valve" is called so because it can direct liquid flow either through an LC column or it can bypass the LC column by directing liquid flow through a bypass fluidic path.

The "trap-bypass-selection valve" is called so because direct liquid flow to a trap column via the load-elute valve and the trap-selection valve or it can bypass the trap-column fluidic path by directing liquid flow to the column-bypass valve via a bypass fluidic path.

The "load-elute valve" is called so because it can direct liquid flow such that a sample can be loaded into a trap column or eluted from a trap column via the trap-selection valve.

According to an embodiment, the LC system further comprises a controller configured to switch the sample-injection valve, the trap-bypass-selection valve, the column-bypass valve, the load-elute valve and the trap-selection valve of the same fluidic stream between any one of a continuous-flow-infusion/dilute-shoot mode, a trap-elute mode, an LC mode and a trap-elute-LC mode.

According to an embodiment, the continuous-flow-infusion/dilute-shoot mode comprises a switch status in which there is a direct fluidic connection between the sample-injection-to-trap-bypass-selection port of the sample-injection valve and the analytical output port of the column-bypass valve via the bypass fluidic path connected to the trap-bypass-selection valve and the bypass fluidic path connected to the column-bypass valve.

According to an embodiment, the trap-elute mode comprises a switch status in which there is a direct fluidic connection between a trap column connected to the trap-selection valve and the analytical output port of the column-bypass valve via the trap-selection valve, the load-elute valve and the bypass fluidic path connected to the column-bypass valve.

According to an embodiment, the LC mode comprises a switch status in which there is a direct fluidic connection between the sample-injection-to-trap-bypass-selection port of the sample-injection valve and the analytical output port of the column-bypass valve via the bypass fluidic path connected to the trap-bypass-selection valve and an LC column connected to the column-bypass valve.

According to an embodiment, the trap-elute-LC mode comprises a switch status in which there is a direct fluidic connection between a trap column connected to the trap-selection valve and the analytical output port of the column-bypass valve via the trap-selection valve, the load-elute valve, the trap-bypass-selection valve and an LC column connected to the column-bypass valve.

The term controller as used herein encompasses any physical or virtual processing device and in particular a programmable logic controller running a computer-readable program or software provided with instructions to perform operations in accordance with an operation plan and in particular associated with the operation of switching the sample-injection valve, the trap-bypass-selection valve, the column-bypass valve, the load-elute valve and the trap-selection valve in order to switch between different chromatographic modes and execute workflow steps within individual chromatographic modes as needed in an automated manner. This may include further valve switching and operation of the LC pumps to operate in synchrony with the respective chromatographic modes and scheduled workflow steps.

The controller may be a separate logic entity in communication with the LC system. In some embodiments, the controller might be integral with a data management unit, may be comprised by a server computer and/or be part of one clinical diagnostic system or even distributed across a plurality of LC systems.

The controller may be also configurable to control the LC system in a way that workflow(s) and workflow step(s) are conducted by the LC system.

In particular, the controller may communicate and/or cooperate with a scheduler and/or data manager in order to take into account incoming analysis orders and/or received analysis orders and a number of scheduled process operations associated with the execution of the analysis orders in order to schedule and execute switching between different chromatographic modes.

A second liquid chromatographic (LC) system is herein also introduced, which comprises at least one fluidic stream, the fluidic stream comprising a first substream and a second substream.

In particular, the first substream comprises a first sample-injection valve comprising a plurality of ports and a multi-way switch to switch fluidic connections between ports, including a sample input port fluidically connected to a sample input nozzle, an aspiration/dispensing-pump port fluidically connected to a sample aspiration pump, a sample-loop-input port and a sample-loop-output port interconnected by a sample loop, an LC-pump port fluidically connected to an LC pump and a sample-injection-to-load-elute port. The first substream further comprises a load-elute valve comprising a plurality of ports and a multi-way switch to switch fluidic connections between ports, including a load-elute-to-sample-injection port fluidically connected to the sample-injection-to-load-elute port of the first sample-injection port, an LC-pump port fluidically connected to an LC pump, a waste port fluidically connected to a waste, an analytical output port and two load-elute-to-trap-selection ports. The first substream further comprises a trap-selection valve comprising a plurality of ports and a multi-way switch to switch fluidic connections between ports, including two trap-selection-to-load-elute ports fluidically connected to the load-elute-to-trap-selection ports respectively of the load-elute valve, at least one pair of trap-column ports interconnected by a trap column, and two trap-selection-to-trap-LC-transfer ports.

The second substream comprises a second sample-injection valve comprising a plurality of ports and a multi-way switch to switch fluidic connections between ports, including a sample input port fluidically connected to a sample input nozzle, an aspiration/dispensing-pump port fluidically connected to a sample aspiration pump, a sample-loop-input port and a sample-loop-output port interconnected by a sample loop, an LC-pump port fluidically connected to an LC pump and a sample-injection-to-trap-LC-transfer port. The second substream further comprises a column-bypass valve comprising a plurality of ports and a multi-way switch to switch fluidic connections between ports, including at least one pair of LC-columns ports interconnected by an LC analytical column, two bypass ports interconnected by a bypass fluidic path, an analytical output port, and a column-bypass-to-trap-LC-transfer port.

The fluidic stream further comprises a trap-LC substream transfer valve comprising a plurality of ports and a multi-way switch to switch fluidic connections between ports, including one pair of trap-column ports interconnected by a trap column, two trap-LC-transfer-to-trap-selection ports fluidically connected to the two trap-selection-to-trap-LC-transfer ports respectively of the trap-selection valve, a trap-LC-transfer-to-column-bypass ports fluidically connected to the column-bypass-to-trap-LC-transfer port of the column-bypass valve and a trap-LC-transfer-to-sample-injection port fluidically connected to the sample-injection-to-trap-LC-transfer port of the second sample injection valve.

The fluidic stream further comprises a substream-selection valve comprising a plurality of ports and a multi-way switch to switch fluidic connections between ports comprising a substream-selection-to-load-elute port fluidically connected to the analytical output port of the load-elute valve, a substream-selection-to-column-bypass port fluidically connected to the analytical output port of the column-bypass valve, and a substream-selection-analytical-output port.

The first and second sample-injection valves, the load-elute valve, the trap-selection valve, the column-bypass valve, the trap-LC substream transfer valve and the substream-selection valve are LC switching valves.

Analogously to the first LC system, also in the second LC system the LC pumps may have dedicated functions or multiple functions. For example, the same LC pump may be connected to two different ports of respective different valves via, e.g., an additional switch valve, in order to connect alternately to one or the other.

According to an embodiment of the second LC system, the column-bypass valve is an LC-column selection valve to select between HPLC or UHPLC columns and comprising a plurality of pairs of LC-column ports, where each pair can be interconnected by a HPLC or UHPLC column and/or the trap-selection valve is a trap-column selection valve to select between trap-columns and comprising a plurality of pairs of trap-column ports, where each pair can be interconnected by a trap-column.

For example, the column-bypass valve may be a 2-7 Ways, 6/8/10/12/14 port valve and the HPLC or UHPLC columns may be of the same or different type/selectivity. Also the trap-selection valve may be a 2-7 Ways, 6/8/10/12/14 port valve and the trap columns may be of the same or different type/selectivity.

According to an embodiment, the second LC system further comprises a controller configured to switch the first sample-injection valve, the load-elute valve, the trap-selection valve, the second sample-injection valve, the column-bypass valve, the trap-LC substream transfer valve, and the substream-selection valve between any one of a continuous-flow-infusion/dilute-shoot mode, a trap-elute mode, an LC mode, a trap-elute-LC mode.

According to an embodiment, the continuous-flow-infusion/dilute-shoot mode comprises a switch status in which there is a direct fluidic connection between the sample-injection-to-trap-LC-transfer port of the second sample-injection valve and the substream-selection-analytical-output port of the substream-selection valve via the trap-LC substream transfer valve and the bypass fluidic path connected to the column-bypass valve.

According to an embodiment, the trap-elute mode comprises a switch status in which there is a direct fluidic connection between a trap column connected to the trap-selection valve and substream-selection-analytical-output port of the substream-selection valve via the load-elute valve.

According to an embodiment, the LC mode comprises a switch status in which there is a direct fluidic connection between the sample-injection-to-trap-LC-transfer port of the second sample-injection valve and the substream-selection-analytical-output port of the substream-selection valve via the trap-LC substream transfer valve and via an LC column connected to the column-bypass valve.

According to an embodiment, the trap-elute-LC mode comprises a switch status in which there is a direct fluidic connection between the trap column connected to the trap-LC substream transfer valve and the substream-selection-analytical-output port of the substream-selection valve via an LC column connected to the column-bypass valve.

Otherwise the controller may be the same or be configured to perform the same or similar functions as the controller of the first LC system.

Other and further objects, features and advantages will appear from the following description of exemplary embodiments and accompanying drawings, which serve to explain the principles more in detail.

FIG. 1A shows schematically a first LC system 100 according to a first embodiment. The LC system 100 comprises a fluidic stream 90, the fluidic stream 90 comprising a sample-injection valve 10, a trap-bypass-selection valve 20, a column-bypass valve 30, a load-elute valve 40 and a trap-selection valve 50.

The sample-injection valve 10 comprises a plurality of ports 11, 12, 13, 14, 15, 16 and a multi-way switch to switch fluidic connections between ports 11, 12, 13, 14, 15, 16 including a sample input port 11 fluidically connected to a sample input nozzle 1, an aspiration/dispensing-pump port 12 fluidically connected to a sample aspiration pump 2, a sample-loop-input port 13 and a sample-loop-output port 14 interconnected by a sample loop 17, an LC-pump port 15 fluidically connected to an LC pump 5 and a sample-injection-to-trap-bypass-selection port 16.

The trap-bypass-selection valve 20 comprises a plurality of ports 21, 22, 23, 24, 25, 26 and a multi-way switch to switch fluidic connections between ports 21, 22, 23, 24, 25, 26, including a trap-bypass-selection-to-sample-injection port 21 fluidically connected to the sample-injection-to-trap-bypass-selection port 16 of the sample injection valve 10, two bypass ports 22, 23 interconnected by a bypass fluidic path 27, a trap-bypass-selection-to-column-bypass port 24 and two trap-bypass-selection-to-load-elute ports 25, 26.

The column-bypass valve 30 comprises a plurality of ports 31, 32, 33, 34, 35, 36 and a multi-way switch to switch fluidic connections between ports 31, 32, 33, 34, 35, 36, including a column-bypass-to-trap-bypass-selection port 31 fluidically connected to the trap-bypass-selection-to-column-bypass port 24 of the trap-bypass-selection valve 20, at least one pair of LC-columns ports 32, 33 interconnected by an LC analytical column 37, two bypass ports 34, 35 interconnected by a bypass fluidic path 38 and an analytical output port 36. Although only one pair of LC-column ports 32, 33 interconnected by an LC analytical column 37 is shown in this example, the column-bypass valve 30 can be an LC-column selection valve to select between HPLC or UHPLC columns and comprising a plurality of pairs of LC-column ports, where each pair can be interconnected by a HPLC or UHPLC column.

The load-elute valve 40 comprises a plurality of ports 41, 42, 43, 44, 45, 46 and a multi-way switch to switch fluidic connections between ports 41, 42, 43, 44, 45, 46, including two load-elute-to-trap-bypass-selection ports 41, 42 fluidically connected to the trap-bypass-selection-to-load-elute ports 25, 26 respectively of the trap-bypass-selection valve 20, an LC-pump port 43 fluidically connected to an LC pump 3, a waste port 44 fluidically connected to a waste 4, and two load-elute-to-trap-selection ports 45, 46.

The trap-selection valve 50 comprises a plurality of ports 51, 52, 53, 54 and a multi-way switch to switch fluidic connections between ports 51, 52, 53, 54, including two trap-selection-to-load-elute ports 51, 52 fluidically connected to the load-elute-to-trap-selection ports 45, 46 respectively of the load-elute valve 40, at least one pair of trap-column ports 53, 54 interconnected by a trap column 57. Although only one pair of trap-column ports 53, 54 interconnected by a trap column 57 is shown in this example, the trap-selection valve 50 is a trap-column selection valve to select between trap-columns and comprising a plurality of pairs of trap-column ports, where each pair can be interconnected by a trap-column 57.

The LC system 100 further comprises a controller 60 configured to switch the sample-injection valve 10, the trap-bypass-selection valve 20, the column-bypass valve 30, the load-elute valve 40 and the trap-selection valve 50 of the same fluidic stream 90 between any one of a continuous-flow-infusion/dilute-shoot mode, a trap-elute mode, an LC mode and a trap-elute-LC mode.

In particular, in the embodiment of FIG. 1A the LC system 100 is shown in a first switch status of a continuous-flow-infusion/dilute-shoot mode, in which the sample-injection valve 10 is switched such that the sample input port 11 is fluidically connected to the sample-loop-input port 13 and the sample-loop-output port 14 is fluidically connected to the aspiration/dispensing-pump port 12. Thus, the sample aspiration pump 2 can aspirate a sample through the sample input nozzle 1 into the sample loop 17. Also, the sample-injection valve 10, the trap-bypass-selection valve 20 and the column-bypass valve 30 are switched such that there is a direct fluidic connection between the sample-injection-to-trap-bypass-selection port 16 of the sample-injection valve 10 and the analytical output port 36 of the column-bypass valve 30 via the bypass fluidic path 27 connected to the trap-bypass-selection valve 20 and the bypass fluidic path 38 connected to the column-bypass valve 30.

Figure 1B:
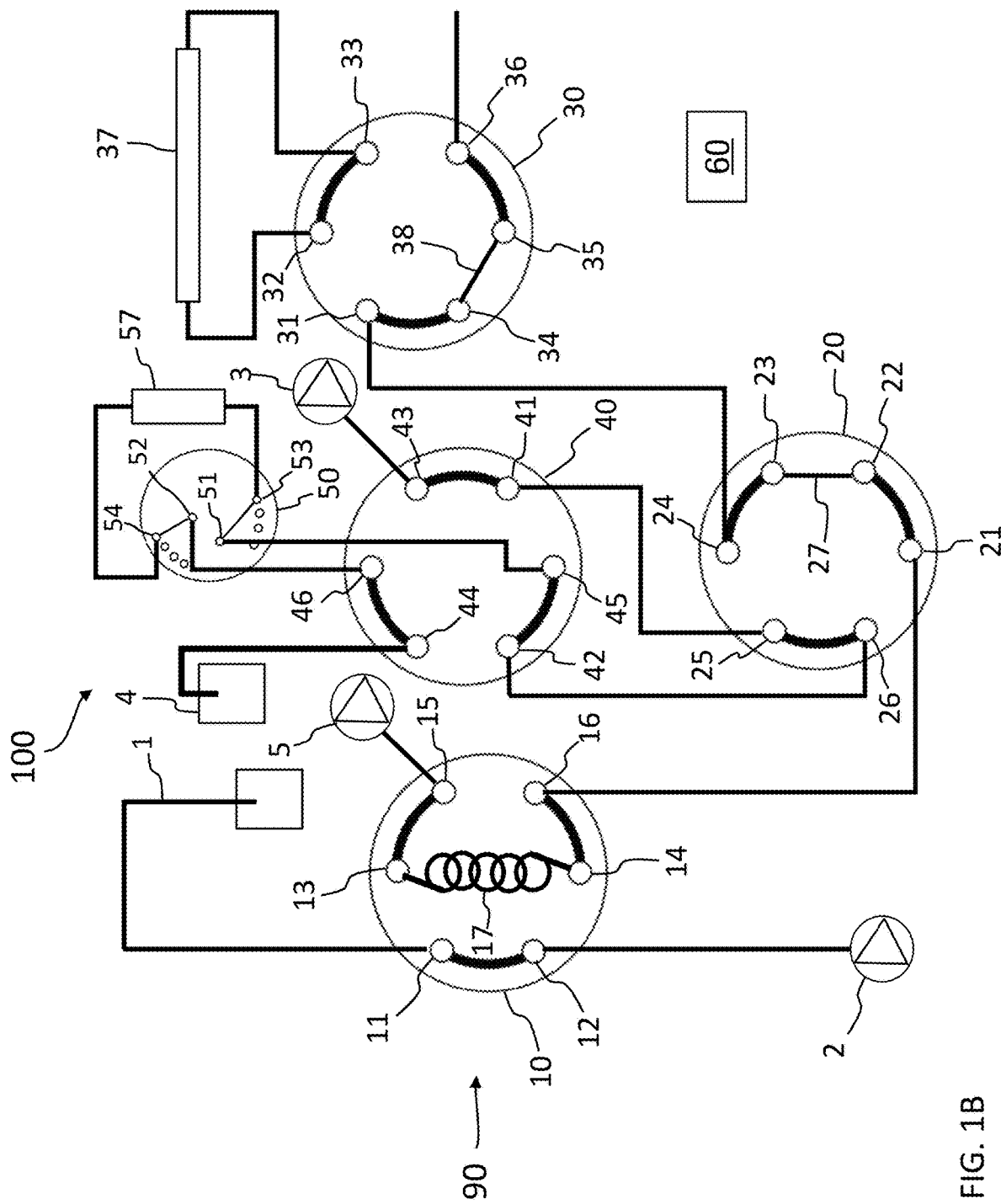
FIG. 1B shows schematically the same LC system of FIG. 1A in a second switch status of the same continuous-flow-infusion/dilute-shoot mode.

FIG. 1B shows schematically the same LC system 100 of FIG. 1A in a second switch status of the same continuous-flow-infusion/dilute-shoot mode, in which the sample-injection valve 10 is switched such that the sample-loop-input port 13 and the sample-loop-output port 14 interconnected by the sample loop 17 are fluidically connected to the LC-pump port 15 and to the sample-injection-to-trap-bypass-selection port 16 respectively. In this way, the LC pump 5 can be activated for pumping the sample aspirated into the sample loop 17 from the sample-injection-to-trap-bypass-selection port 16 of the sample-injection valve 10 to the analytical output port 36 of the column-bypass valve 30 via the bypass fluidic path 27 connected to the trap-bypass-selection valve 20 and the bypass fluidic path 38 connected to the column-bypass valve 30.

This mode is called "continuous-flow-infusion/dilute-shoot mode" because the sample can flow directly to the analytical output transported by a mobile phase pumped by the LC pump 5 without passing through an LC column or trap-column.

Figure 2A:
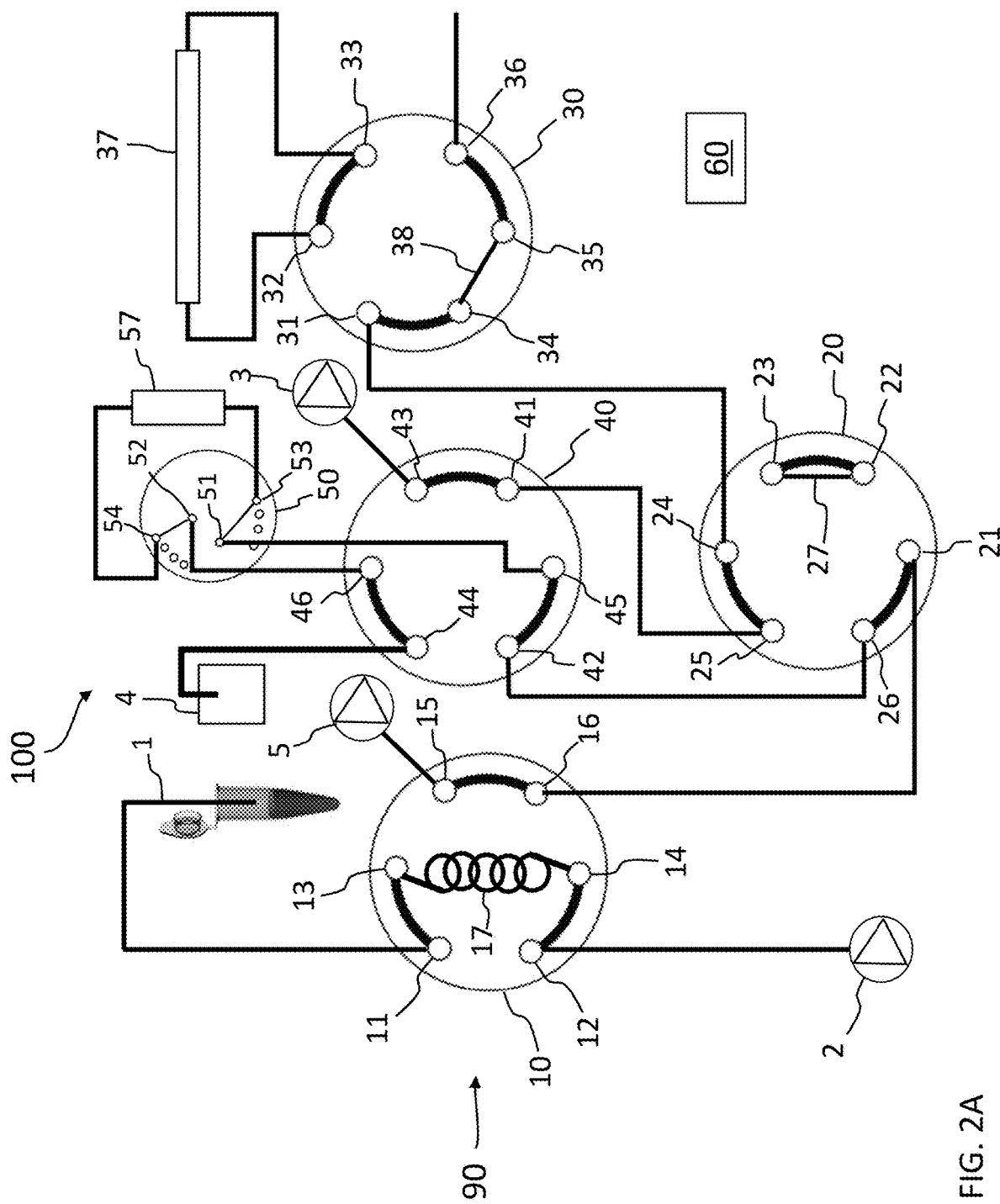
FIG. 2A shows schematically the same LC system of FIG. 1A in a first switch status of a trap-elute mode.

FIG. 2A shows schematically the same LC system 100 of FIG. 1A in a first switch status of a trap-elute mode, in which the sample-injection valve 10 is switched such that the sample input port 11 is fluidically connected to the sample-loop-input port 13 and the sample-loop-output port 14 is fluidically connected to the aspiration/dispensing-pump port 12. Thus, the sample aspiration pump 2 can aspirate a sample through the sample input nozzle 1 into the sample loop 17. Also, the sample-injection valve 10, the trap-bypass-selection valve 20, the column-bypass valve 30, the load-elute valve 40 and the trap-selection valve 50 are switched such that there is a direct fluidic connection between the sample-injection-to-trap-bypass-selection port 16 of the sample-injection valve 10 and the waste port 44 of the load-elute valve 40 via the trap-bypass-selection valve 20, the load-elute valve 40, the trap-selection valve 50 via a trap-column 57 and again via the load-elute valve 40. Also, there is a direct fluidic connection between the LC-pump port 43 of the load-elute valve 40 and the analytical output port 36 of the column-bypass valve 30 via the trap-bypass-selection valve 20 and the bypass fluidic path 38 connected to the column-bypass valve 30.

Figure 2B:
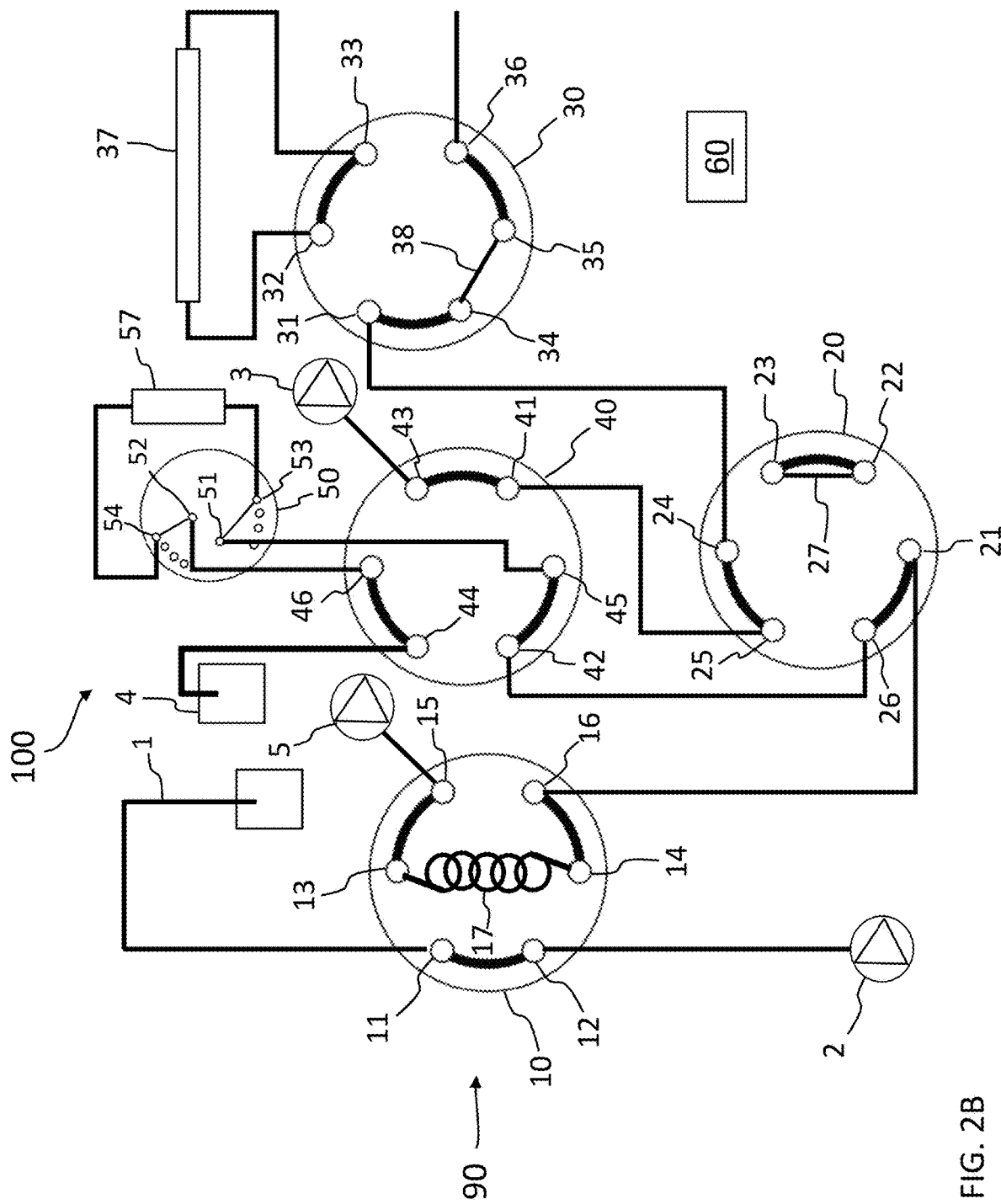
FIG. 2B shows schematically the same LC system of FIG. 2A in a second switch status of the same trap-elute mode.

FIG. 2B shows schematically the same LC system 100 of FIG. 2A in a second switch status of the same trap-elute mode, in which the sample-injection valve 10 is switched such that the sample-loop-input port 13 and the sample-loop-output port 14 interconnected by the sample loop 17 are fluidically connected to the LC-pump port 15 and to the sample-injection-to-trap-bypass-selection port 16 respectively. In this way, the LC pump 5 can be activated for loading the sample aspirated into the sample loop 17 from the sample-injection-to-trap-bypass-selection port 16 of the sample-injection valve 10 into the trap-column 57 connected to the trap-selection valve 50.

Figure 2C:
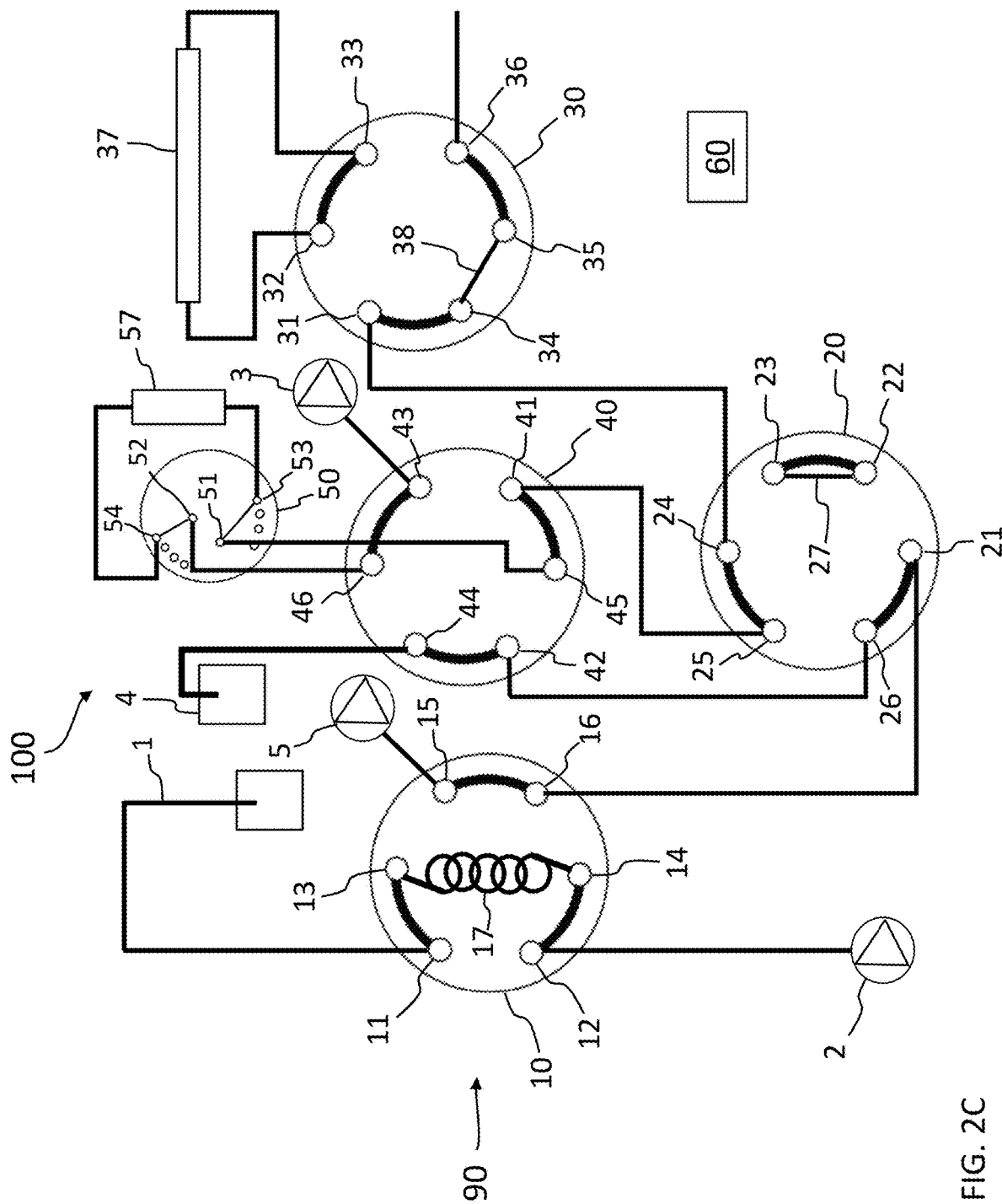
FIG. 2C shows schematically the same LC system of FIG. 2A in a third switch status of the same trap-elute mode.

FIG. 2C shows schematically the same LC system 100 of FIG. 2A in a third switch status of the same trap-elute mode, in which the sample-injection valve 10 is switched again such that the sample input port 11 is fluidically connected to the sample-loop-input port 13 and the sample-loop-output port 14 is fluidically connected to the aspiration/dispensing-pump port 12. The LC pump 2 may be used to wash the sample input nozzle 1 and then aspirate a new sample. Also, the load-elute valve 40 is switched such that there is a direct fluidic connection between the trap column 57 connected to the trap-selection valve 50 and onto which the sample was loaded and the analytical output port 36 of the column-bypass valve 30 via the trap-selection valve 50, the load-elute valve 40 and the bypass fluidic path 38 connected to the column-bypass valve 30. In particular, there is a direct fluidic connection between the LC-pump port 43 of the load-elute valve 40 and a trap-column port 54 opposite to the trap-column port 53 through which the sample was loaded into the trap column 57 so that the LC pump 3 can be activated for back-flushing and eluting the trapped sample up to the analytical output port 36 of the column-bypass valve 30. At the same time the LC-pump port 15 of the sample-injection valve 10 is connected to the sample-injection-to-trap-bypass-selection port 16 so that the LC pump 5 may be used to wash another part of the fluidic path.

This mode is called "trap-elute mode" because the sample is first trapped into a trap column 57 and then eluted and transported directly to the analytical output by a mobile phase pumped by the LC pump 3 without passing through any other LC column.

Figure 3A:
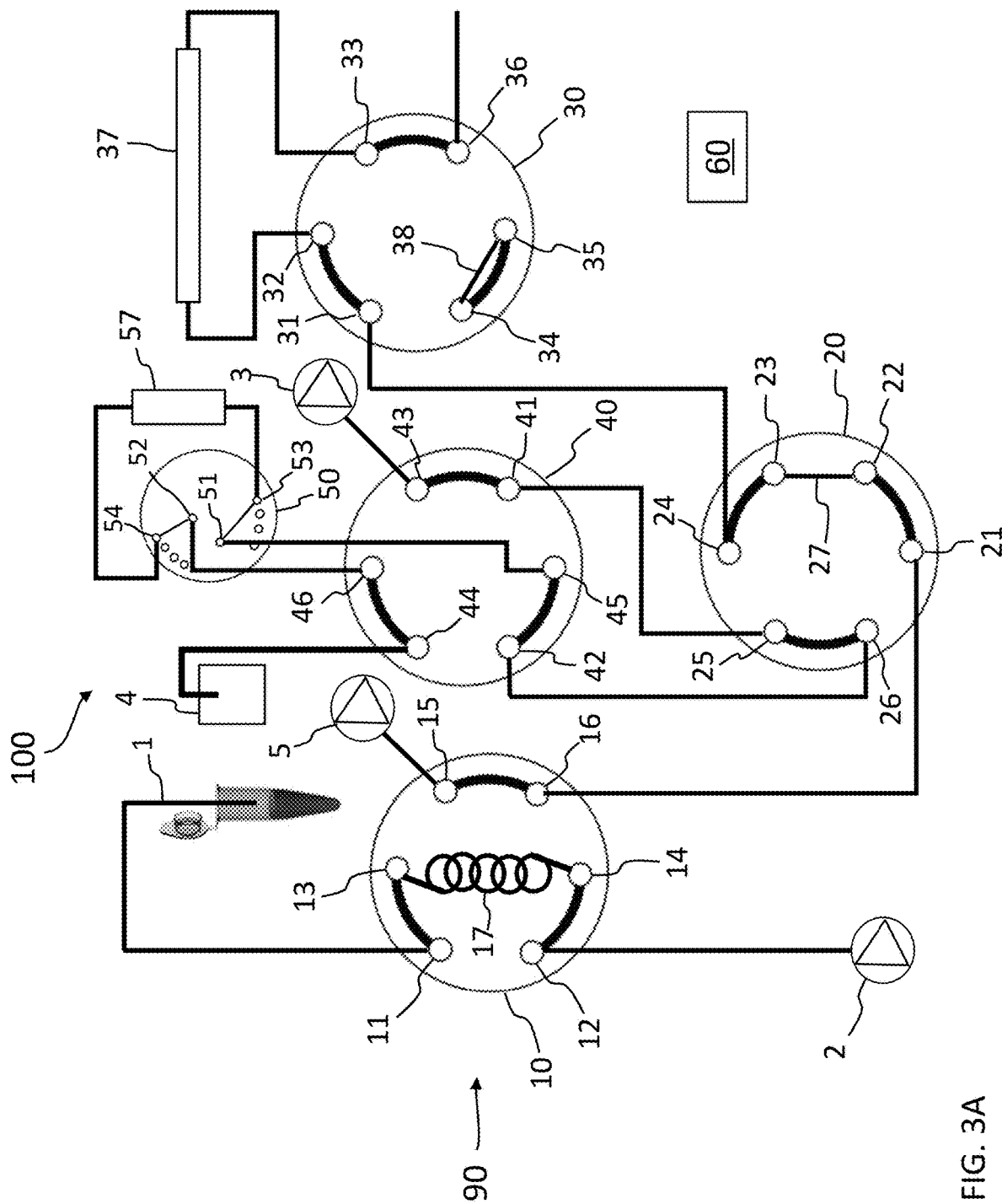
FIG. 3A shows schematically the same LC system of FIG. 1A in a first switch status of an LC mode.

FIG. 3A shows schematically the same LC system 100 of FIG. 1A in a first switch status of an LC mode, in which the sample-injection valve 10 is switched such that the sample input port 11 is fluidically connected to the sample-loop-input port 13 and the sample-loop-output port 14 is fluidically connected to the aspiration/dispensing-pump port 12. Thus, the sample aspiration pump 2 can aspirate a sample through the sample input nozzle 1 into the sample loop 17. Also, the sample-injection valve 10, the trap-bypass-selection valve 20 and the column-bypass valve 30 are switched such that there is a direct fluidic connection between the sample-injection-to-trap-bypass-selection port 16 of the sample-injection valve 10 and the analytical output port 36 of the column-bypass valve 30 via the bypass fluidic path 27 connected to the trap-bypass-selection valve 20 and an LC column 37 connected to the column-bypass valve 30.

Figure 3B:
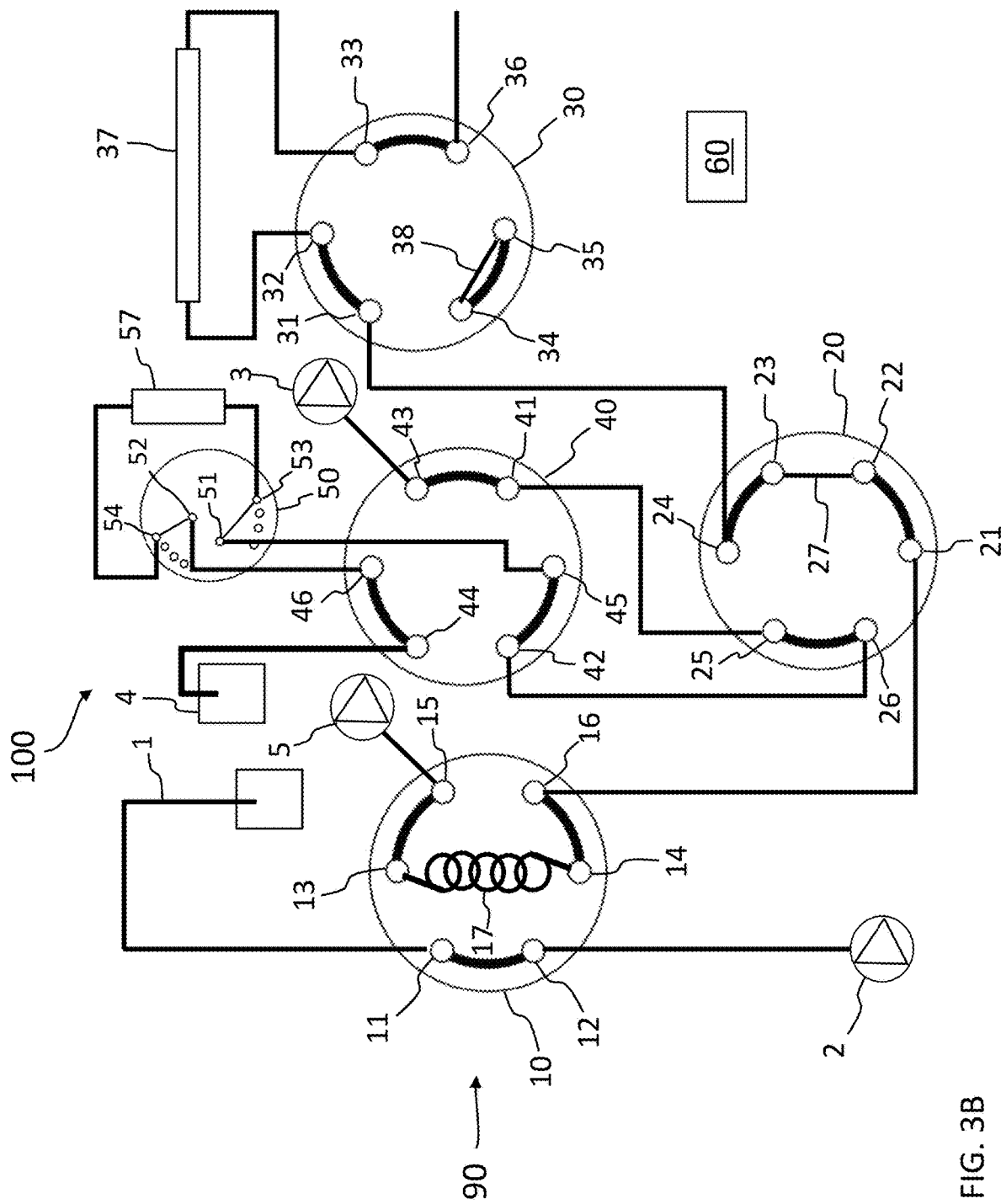
FIG. 3B shows schematically the same LC system of FIG. 3A in a second switch status of the same LC mode.

FIG. 3B shows schematically the same LC system 100 of FIG. 3A in a second switch status of the same LC mode, in which the sample-injection valve 10 is switched such that the sample-loop-input port 13 and the sample-loop-output port 14 interconnected by the sample loop 17 are fluidically connected to the LC-pump port 15 and to the sample-injection-to-trap-bypass-selection port 16 respectively. In this way, the LC pump 5 can be activated for loading the sample aspirated into the sample loop 17 from the sample-injection-to-trap-bypass-selection port 16 of the sample-injection valve 10 into the LC-column 37 connected to the column-bypass valve 30.

Figure 3C:
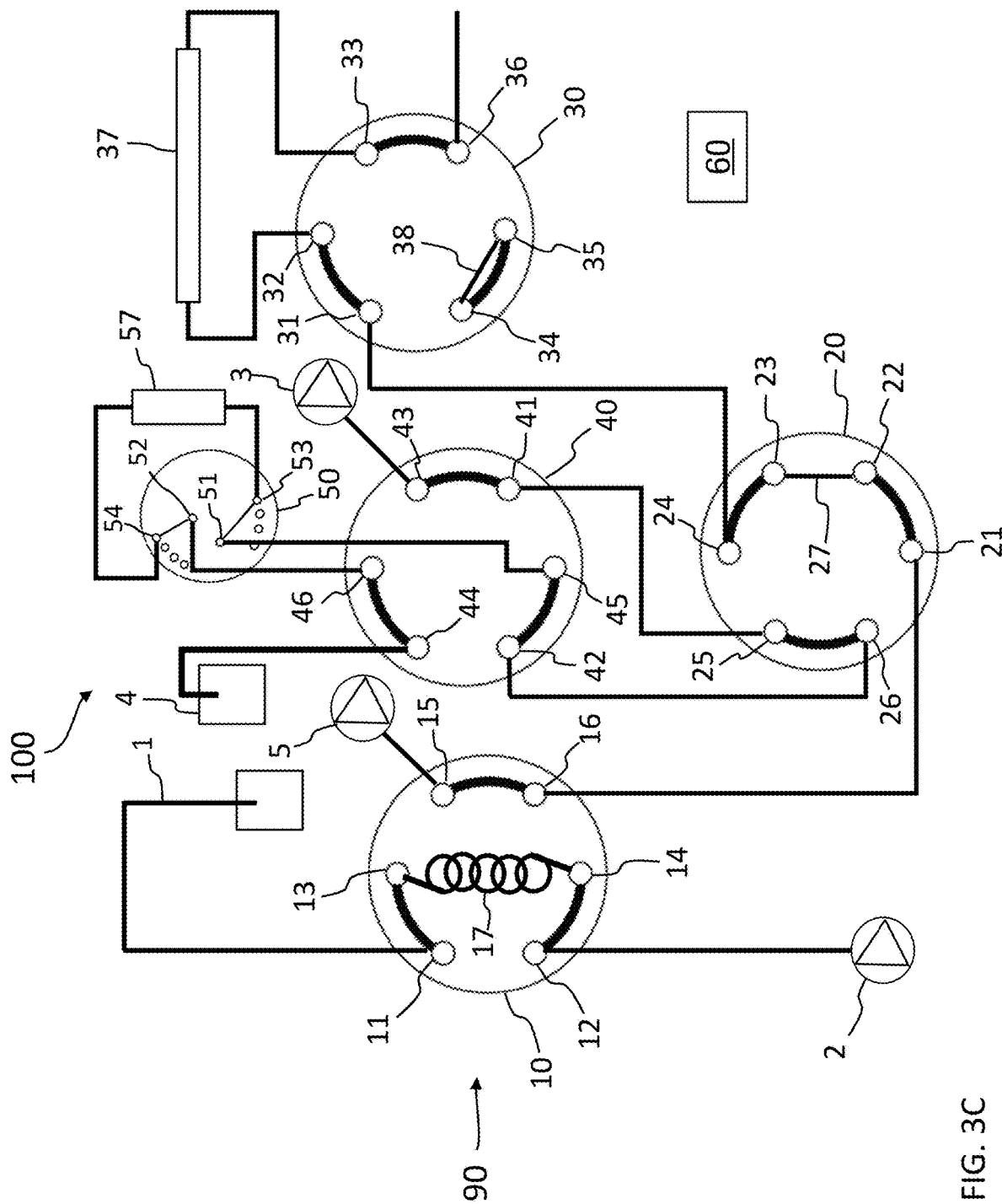
FIG. 3C shows schematically the same LC system of FIG. 3A in a third switch status of the same LC mode.

FIG. 3C shows schematically the same LC system 100 of FIG. 3A in a third switch status of the same LC mode, in which the sample-injection valve 10 is switched again such that the sample input port 11 is fluidically connected to the sample-loop-input port 13 and the sample-loop-output port 14 is fluidically connected to the aspiration/dispensing-pump port 12. The LC pump 2 may be used to wash the sample input nozzle 1 and then aspirate a new sample.

This mode is called "LC mode" because the sample is loaded into an LC column 37 and then eluted to the analytical output by a mobile phase pumped by the LC pump 5 without passing through a trap-column first.

Figure 4A:
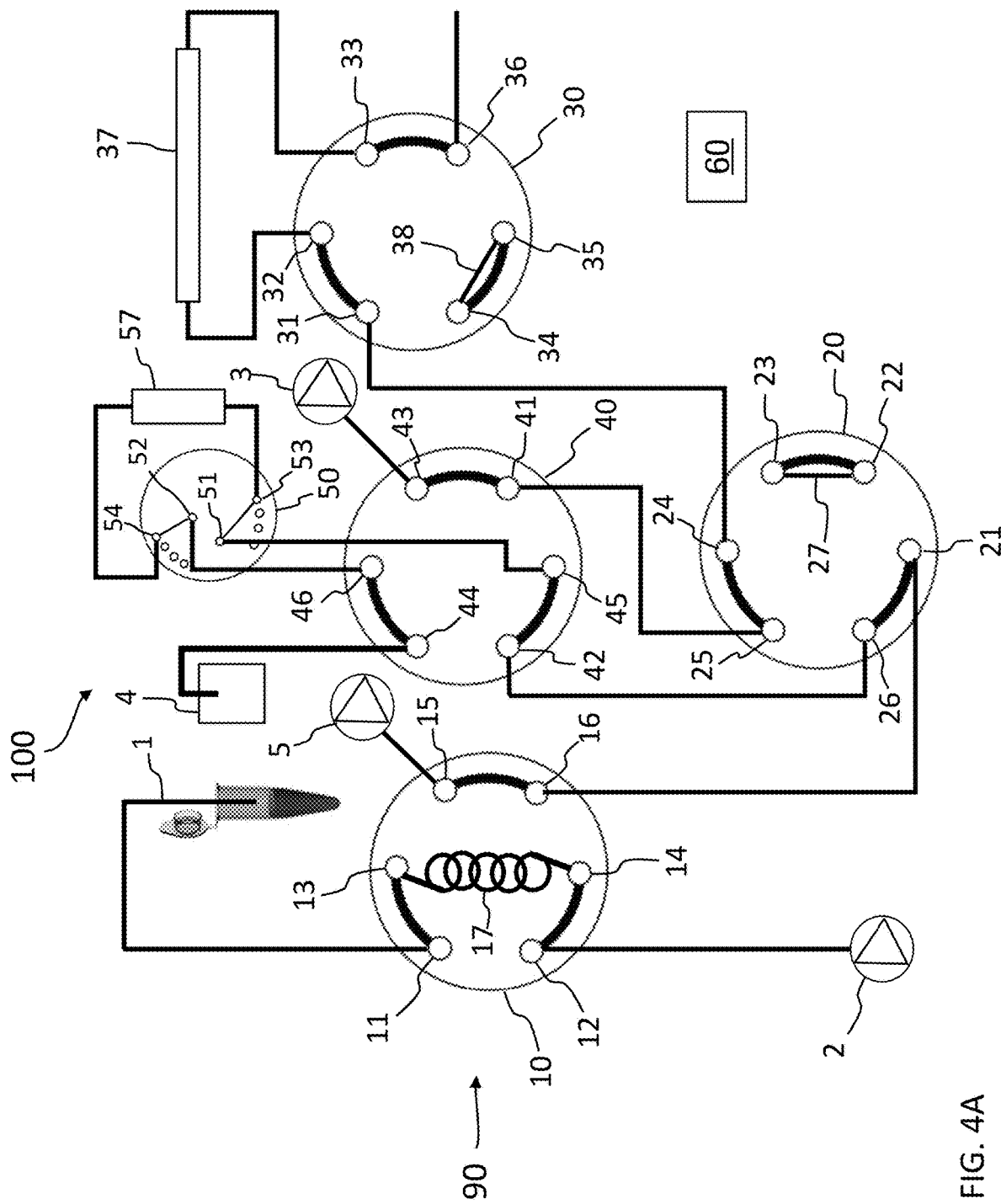
FIG. 4A shows schematically the same LC system of FIG. 1A in a first switch status of a trap-elute-LC mode.

FIG. 4A shows schematically the same LC system 100 of FIG. 1A in a first switch status of a trap-elute-LC mode, in which the sample-injection valve 10 is switched such that the sample input port 11 is fluidically connected to the sample-loop-input port 13 and the sample-loop-output port 14 is fluidically connected to the aspiration/dispensing-pump port 12. Thus, the sample aspiration pump 2 can aspirate a sample through the sample input nozzle 1 into the sample loop 17. Also, the sample-injection valve 10, the trap-bypass-selection valve 20, the column-bypass valve 30, the load-elute valve 40 and the trap-selection valve 50 are switched such that there is a direct fluidic connection between the sample-injection-to-trap-bypass-selection port 16 of the sample-injection valve 10 and the waste port 44 of the load-elute valve 40 via the trap-bypass-selection valve 20, the load-elute valve 40, the trap-selection valve 50 via a trap-column 57 and again via the load-elute valve 40. Also, there is a direct fluidic connection between the LC-pump port 43 of the load-elute valve 40 and the analytical output port 36 of the column-bypass valve 30 via the trap-bypass-selection valve 20 and an LC column 37 connected to the column-bypass valve 30.

Figure 4B:
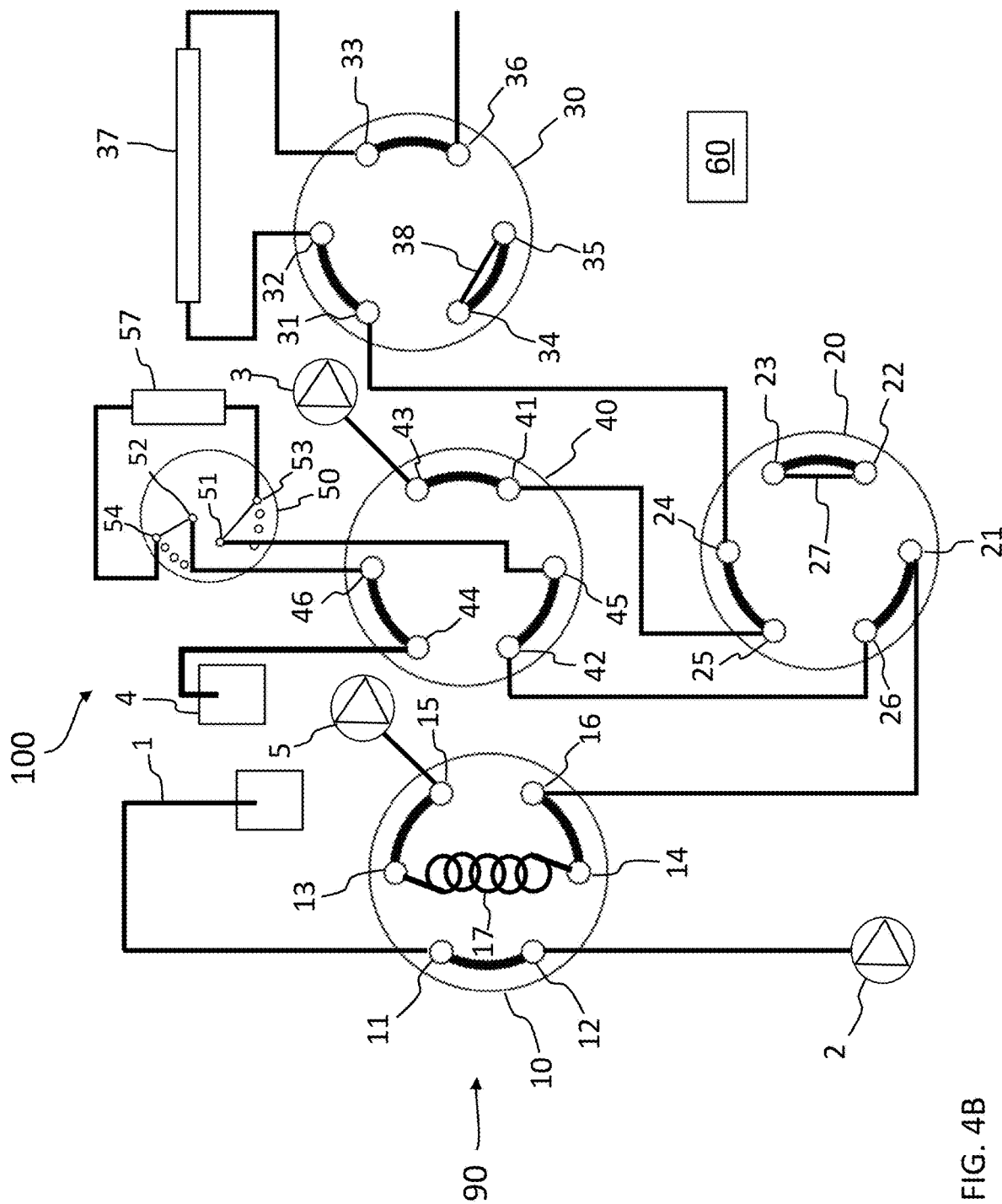
FIG. 4B shows schematically the same LC system of FIG. 4A in a second switch status of the same trap-elute-LC mode.

FIG. 4B shows schematically the same LC system 100 of FIG. 4A in a second switch status of the same trap-elute-LC mode, in which the sample-injection valve 10 is switched such that the sample-loop-input port 13 and the sample-loop-output port 14 interconnected by the sample loop 17 are fluidically connected to the LC-pump port 15 and to the sample-injection-to-trap-bypass-selection port 16 respectively. In this way, the LC pump 5 can be activated for loading the sample aspirated into the sample loop 17 from the sample-injection-to-trap-bypass-selection port 16 of the sample-injection valve 10 into the trap-column 57 connected to the trap-selection valve 50.

Figure 4C:
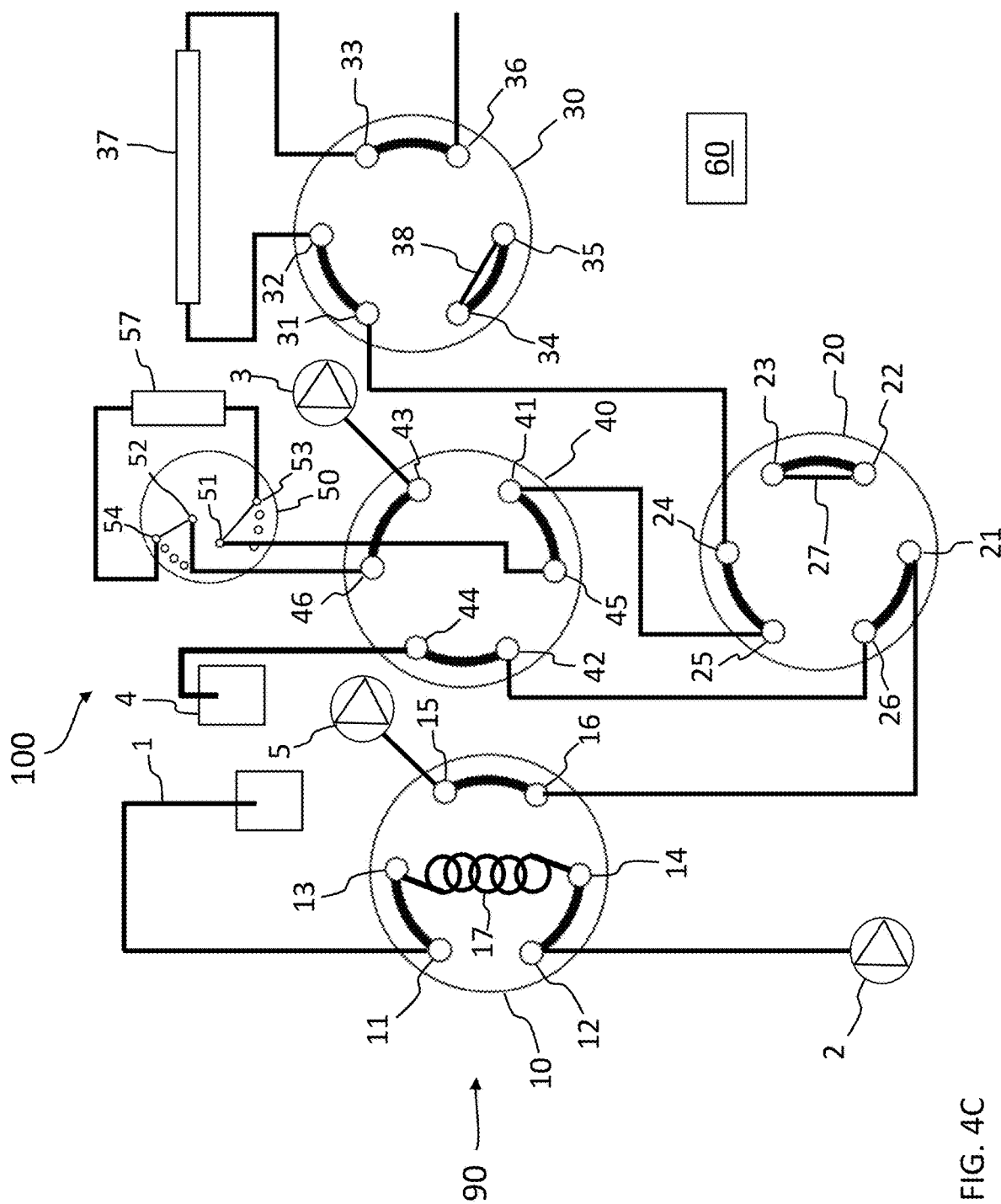
FIG. 4C shows schematically the same LC system of FIG. 4A in a third switch status of the same trap-elute-LC mode.

FIG. 4C shows schematically the same LC system 100 of FIG. 4A in a third switch status of the same trap-elute-LC mode, in which the sample-injection valve 10 is switched again such that the sample input port 11 is fluidically connected to the sample-loop-input port 13 and the sample-loop-output port 14 is fluidically connected to the aspiration/dispensing-pump port 12. The LC pump 2 may be used to wash the sample input nozzle 1 and then aspirate a new sample. Also, the load-elute valve 40 is switched such that there is a direct fluidic connection between the trap column 57 connected to the trap-selection valve 50 and onto which the sample was loaded and the analytical output port 36 of the column-bypass valve 30 via the trap-selection valve 50, the load-elute valve 40 and the LC column 37 connected to the column-bypass valve 30. In particular, there is a direct fluidic connection between the LC-pump port 43 of the load-elute valve 40 and the trap-column port 54 opposite to the trap-column port 53 through which the sample was loaded into the trap column 57 so that the LC pump 3 can be activated for back-flushing and eluting the trapped sample out of the trap column 57 for loading it into the LC column 37 connected to the column-bypass valve 30.

At the same time the LC-pump port 15 of the sample-injection valve 10 is connected to the sample-injection-to-trap-bypass-selection port 16 so that the LC pump 5 may be used to wash another part of the fluidic path.

This mode is called "trap-elute-LC mode" because the sample is first trapped into a trap column 57 connected to the trap-selection valve 50 and then eluted and loaded into an LC column 37 connected to the column-bypass valve 30.

Figure 5A:
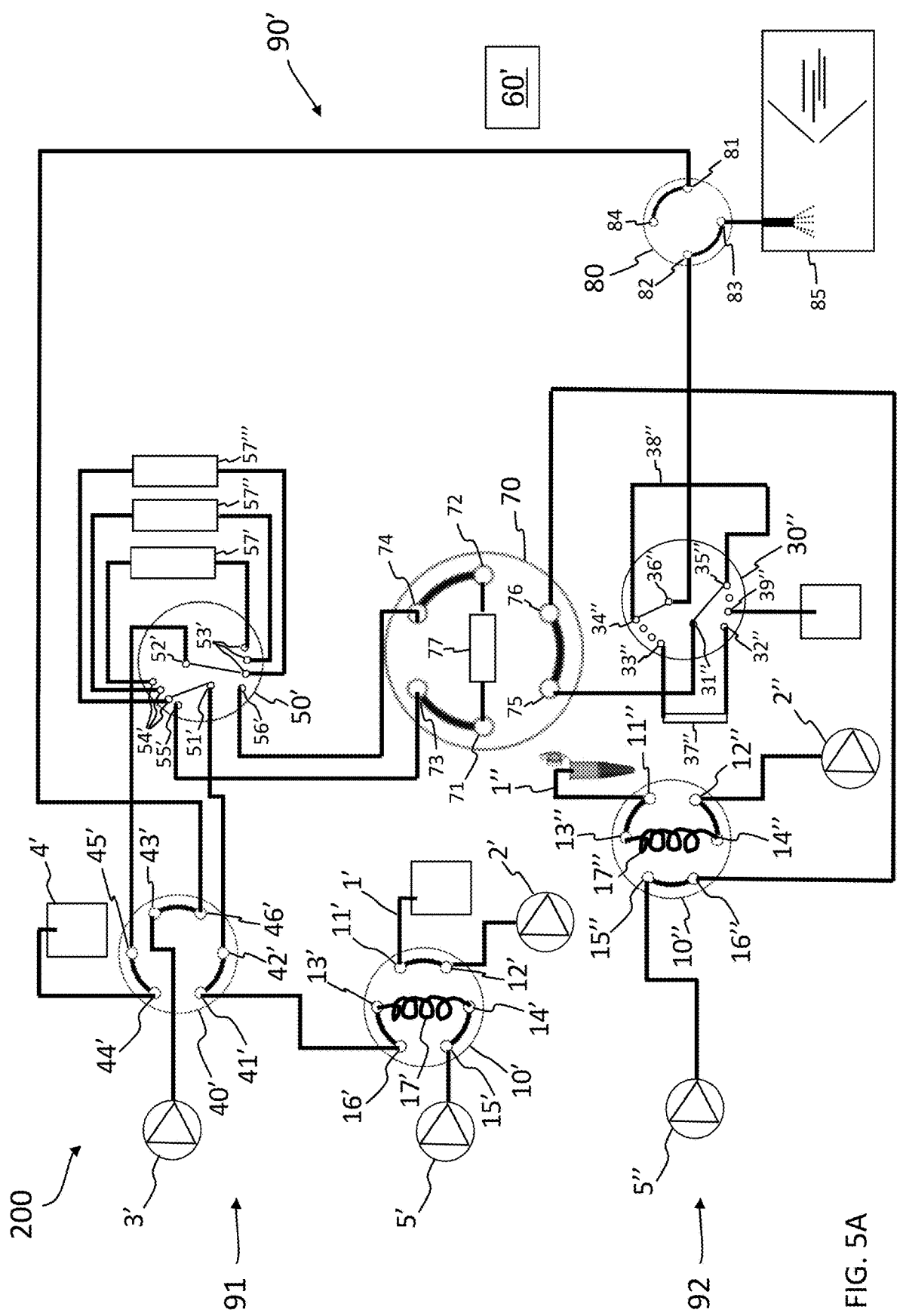
FIG. 5A shows schematically a second LC system according to a second embodiment of the present disclosure in a first switch status of a continuous-flow-infusion/dilute-shoot mode.

FIG. 5A shows schematically a second LC system 200 according to a second embodiment of the present disclosure. The LC system 200 comprises a fluidic stream 90' comprising a first substream 91 and a second substream 92. The first substream 91 comprises a first sample-injection valve 10' comprising a plurality of ports 11', 12', 13', 14', 15', 16' and a multi-way switch to switch fluidic connections between ports 11', 12', 13', 14', 15', 16', including a sample input port 11' fluidically connected to a sample input nozzle 1', an aspiration/dispensing-pump port 12' fluidically connected to a sample aspiration pump 2', a sample-loop-input port 13' and a sample-loop-output port 14' interconnected by a sample loop 17', an LC-pump port 15' fluidically connected to an LC pump 5' and a sample-injection-to-load-elute port 16'.

The first substream 91 further comprises a load-elute valve 40' comprising a plurality of ports 41', 42', 43', 44', 45', 46' and a multi-way switch to switch fluidic connections between ports 41', 42', 43', 44', 45', 46', including a load-elute-to-sample-injection port 41' fluidically connected to the sample-injection-to-load-elute port 16' of the first sample-injection port 10', an LC-pump port 43' fluidically connected to an LC pump 3', a waste port 44' fluidically connected to a waste 4', an analytical output port 46' and two load-elute-to-trap-selection ports 42', 45'.

The first substream 91 further comprises a trap-selection valve 50' comprising a plurality of ports 51', 52', 53', 54', 55', 56' and a multi-way switch to switch fluidic connections between ports 51', 52', 53', 54', 55', 56', including two trap-selection-to-load-elute ports 51', 52' fluidically connected to the load-elute-to-trap-selection ports 42', 44' respectively of the load-elute valve 40', pairs of trap-column ports 53', 54' each interconnected by a trap column 57', 57", 57''' and two trap-selection-to-trap-LC-transfer ports 55', 56'.

The second substream 92 comprises a second sample-injection valve 10" comprising a plurality of ports 11", 12", 13", 14", 15", 16" and a multi-way switch to switch fluidic connections between ports 11", 12", 13", 14", 15", 16", including a sample input port 11" fluidically connected to a sample input nozzle 1", an aspiration/dispensing-pump port 12" fluidically connected to a sample aspiration pump 2", a sample-loop-input port 13" and a sample-loop-output port 14" interconnected by a sample loop 17", an LC-pump port 15" fluidically connected to an LC pump 5" and a sample-injection-to-trap-LC-transfer port 16".

The second substream 92 further comprises a column-bypass valve 30" comprising a plurality of ports 31", 32", 33", 34", 35", 36", 39" and a multi-way switch to switch fluidic connections between ports 31", 32", 33", 34", 35", 36", 39", including at least one pair of LC-columns ports 32", 33" interconnected by an LC analytical column 37", two bypass ports 34", 35" interconnected by a bypass fluidic path 38", an analytical output port 36", and a column-bypass-to-trap-LC-transfer port 31". In the example shown it further comprises a waste port 39" connected to a waste. Although only one LC analytical column 37" is shown in this example, the column-bypass valve 30" is configured as an LC-column selection valve comprising a plurality of pairs of LC-column ports, where each pair can be interconnected by a HPLC or UHPLC column in order to select from a plurality of HPLC or UHPLC columns.

The fluidic stream 90 further comprises a trap-LC substream transfer valve 70 comprising a plurality of ports 71, 72, 73, 74, 75, 76 and a multi-way switch to switch fluidic connections between ports 71, 72, 73, 74, 75, 76, including one pair of trap-column ports 71, 72 interconnected by a trap column 77, two trap-LC-transfer-to-trap-selection ports 73, 74 fluidically connected to the two trap-selection-to-trap-LC-transfer ports 55', 56' respectively of the trap-selection valve 50', a trap-LC-transfer-to-column-bypass port 75 fluidically connected to the column-bypass-to-trap-LC-transfer port 31" of the column-bypass valve 30" and a trap-LC-transfer-to-sample-injection port 76 fluidically connected to the sample-injection-to-trap-LC-transfer port 16" of the second sample injection valve 10".

The fluidic stream 90 further comprises a substream-selection valve 80 comprising a plurality of ports 81, 82, 83, 84 and a multi-way switch to switch fluidic connections between ports 81, 82, 83, 84 comprising a substream-selection-to-load-elute port 81 fluidically connected to the analytical output port 46' of the load-elute valve 40', a substream-selection-to-column-bypass port 82 fluidically connected to the analytical output port 36" of the column-bypass valve 30", and a substream-selection-analytical-output port 83, connected, e.g., to an ionization source 85 of a mass spectrometer.

The second LC system 200 further comprises a controller 60' configured to switch the first sample-injection valve 10', the load-elute valve 40', the trap-selection valve 50', the second sample-injection valve 10", the column-bypass valve 30", the trap-LC substream transfer valve 70, and the substream-selection valve 80 between any one of a continuous-flow-infusion/dilute-shoot mode, a trap-elute mode, an LC mode, a trap-elute-LC mode.

In particular, in the embodiment of FIG. 5A the LC system 200 is shown in a first switch status of a continuous-flow-infusion/dilute-shoot mode, in which the second sample-injection valve 10" is switched such that the sample input port 11" is fluidically connected to the sample-loop-input port 13" and the sample-loop-output port 14" is fluidically connected to the aspiration/dispensing-pump port 12". Thus, the sample aspiration pump 2" can aspirate a sample through the sample input nozzle 1" into the sample loop 17". Also, the second sample-injection valve 10", the column-bypass valve 30", the trap-LC substream transfer valve 70 and the substream-selection valve 80 are switched such that there is a direct fluidic connection between the sample-injection-to-trap-LC-transfer port 16" of the second sample-injection valve 10" and the substream-selection-analytical-output port 83 of the substream-selection valve 80 via the trap-LC substream transfer valve 70 and the bypass fluidic path 38" connected to the column-bypass valve 30".

Figure 5B:
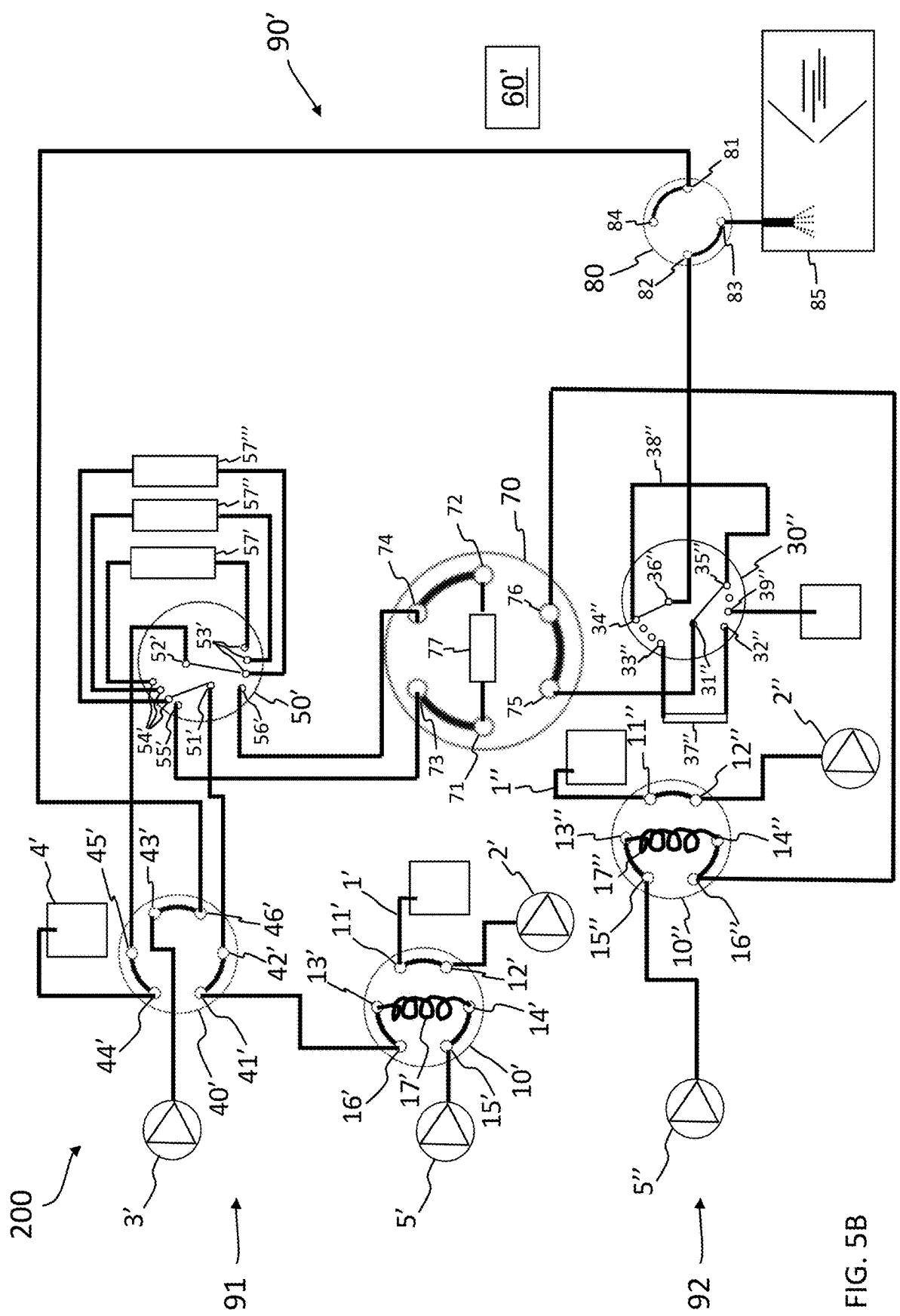
FIG. 5B shows schematically the same LC system of FIG. 5A in a second switch status of the same continuous-flow-infusion/dilute-shoot mode.

FIG. 5B shows schematically the same LC system 200 of FIG. 5A in a second switch status of the same continuous-flow-infusion/dilute-shoot mode, in which the second sample-injection valve 10" is switched such that the sample-loop-input port 13" and the sample-loop-output port 14" interconnected by the sample loop 17" are fluidically connected to the LC-pump port 15" and to the sample-injection-to-trap-LC-transfer port 16" respectively. In this way, the LC pump 5" can be activated for pumping the sample aspirated into the sample loop 17" from the sample-injection-to-trap-LC-transfer port 16" of the second sample-injection valve 10" to substream-selection-analytical-output port 83 of the substream-selection valve 80 via the trap-LC substream transfer valve 70 and the bypass fluidic path 38" connected to the column-bypass valve 30".

Analogously to the previous embodiment of the first LC system 100, this mode is called "continuous-flow-infusion/dilute-shoot mode" because the sample can flow directly to the analytical output transported by a mobile phase pumped by the LC pump 5" without passing through an LC column or trap-column.

Figure 6A:
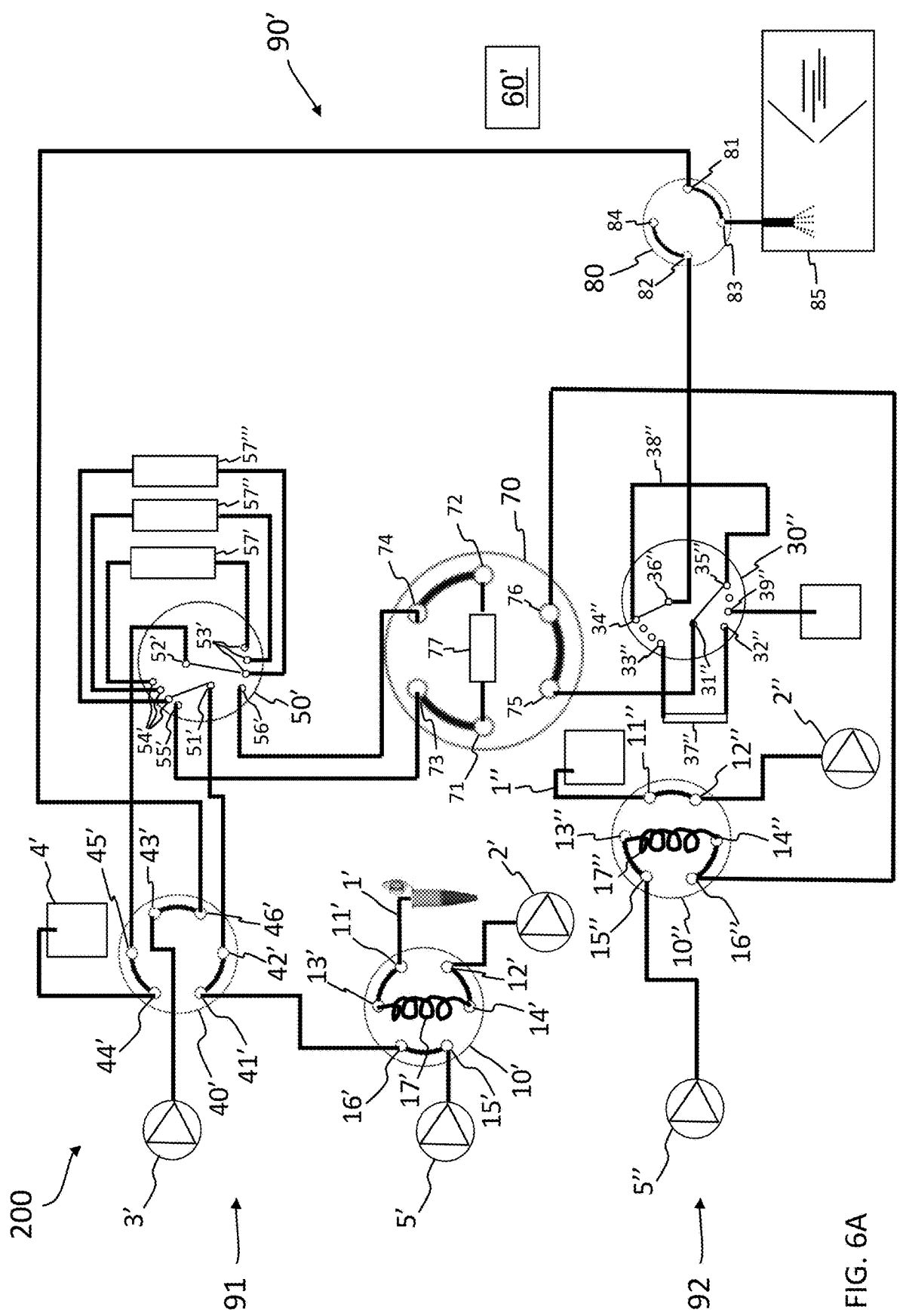
FIG. 6A shows schematically the same LC system of FIG. 5A in a first switch status of a trap-elute mode.

FIG. 6A shows schematically the same LC system 200 of FIG. 5A in a first switch status of a trap-elute mode, in which the first sample-injection valve 10' is switched such that the sample input port 11' is fluidically connected to the sample-loop-input port 13' and the sample-loop-output port 14' is fluidically connected to the aspiration/dispensing-pump port 12'. Thus, the sample aspiration pump 2' can aspirate a sample through the sample input nozzle 1' into the sample loop 17'. Also, the first sample-injection valve 10', the load-elute valve 40', the trap-selection valve 50' and the substream-selection valve 80 are switched such that there is a direct fluidic connection between the sample-injection-to-load-elute port 16' of the first sample-injection valve 10' and the waste port 44' of the load-elute valve 40' via the load-elute valve 40', the trap-selection valve 50' via a trap-column 57''' and again via the load-elute valve 40'. Also, there is a direct fluidic connection between the LC-pump port 43' of the load-elute valve 40' and the substream-selection-analytical-output port 83 of the substream-selection valve 80 via the load-elute valve 40' and the substream-selection valve 80.

Figure 6B:
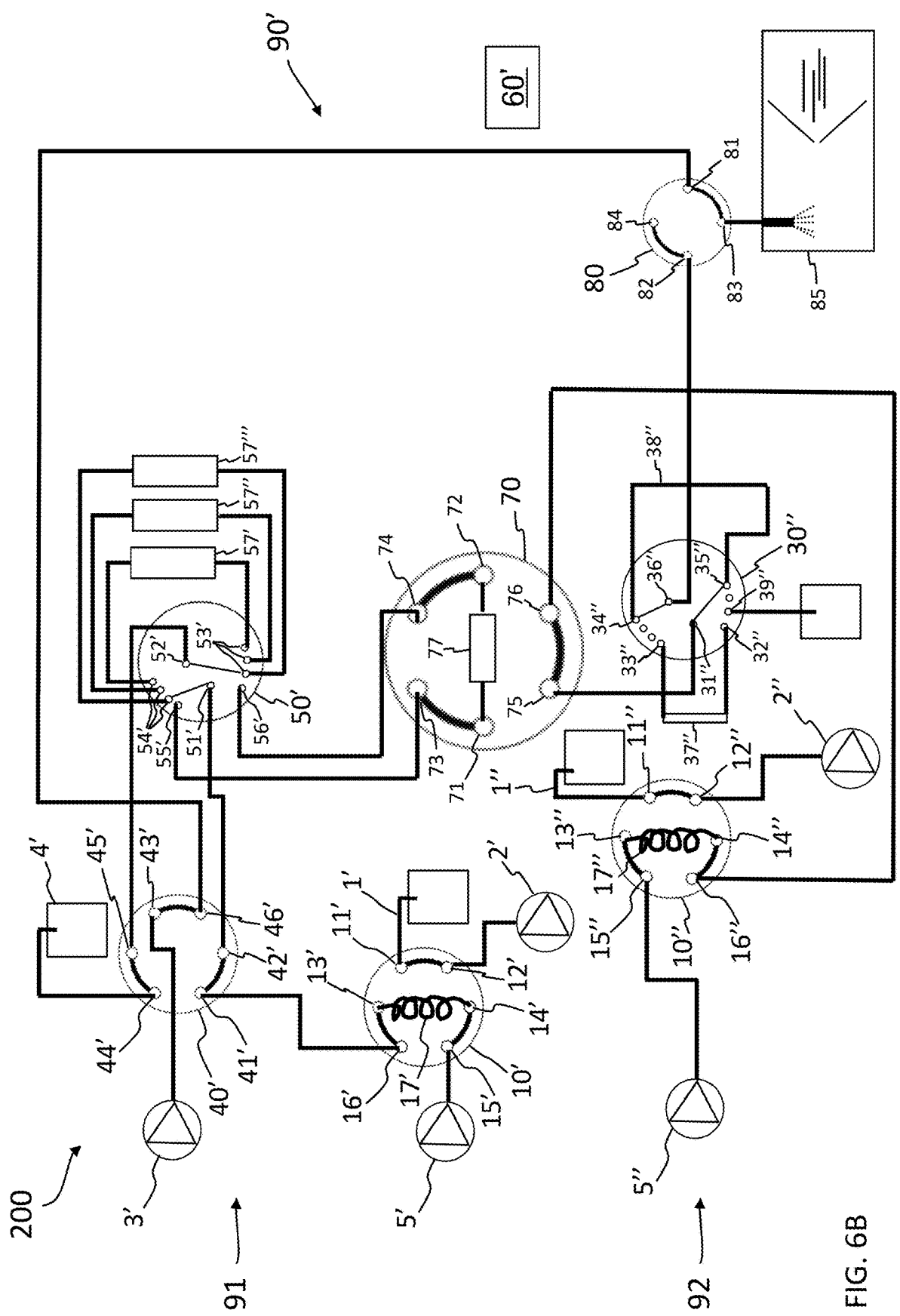
FIG. 6B shows schematically the same LC system of FIG. 6A in a second switch status of the same trap-elute mode.

FIG. 6B shows schematically the same LC system 200 of FIG. 6A in a second switch status of the same trap-elute mode, in which the first sample-injection valve 10' is switched such that the sample-loop-input port 13' and the sample-loop-output port 14' interconnected by the sample loop 17' are fluidically connected to the LC-pump port 15' and to the sample-injection-to-load-elute port 16' respectively. In this way, the LC pump 5' can be activated for loading the sample aspirated into the sample loop 17' from the sample-injection-to-load-elute port 16' of the first sample-injection valve 10' into the trap-column 57''' connected to the trap-selection valve 50'.

Figure 6C:
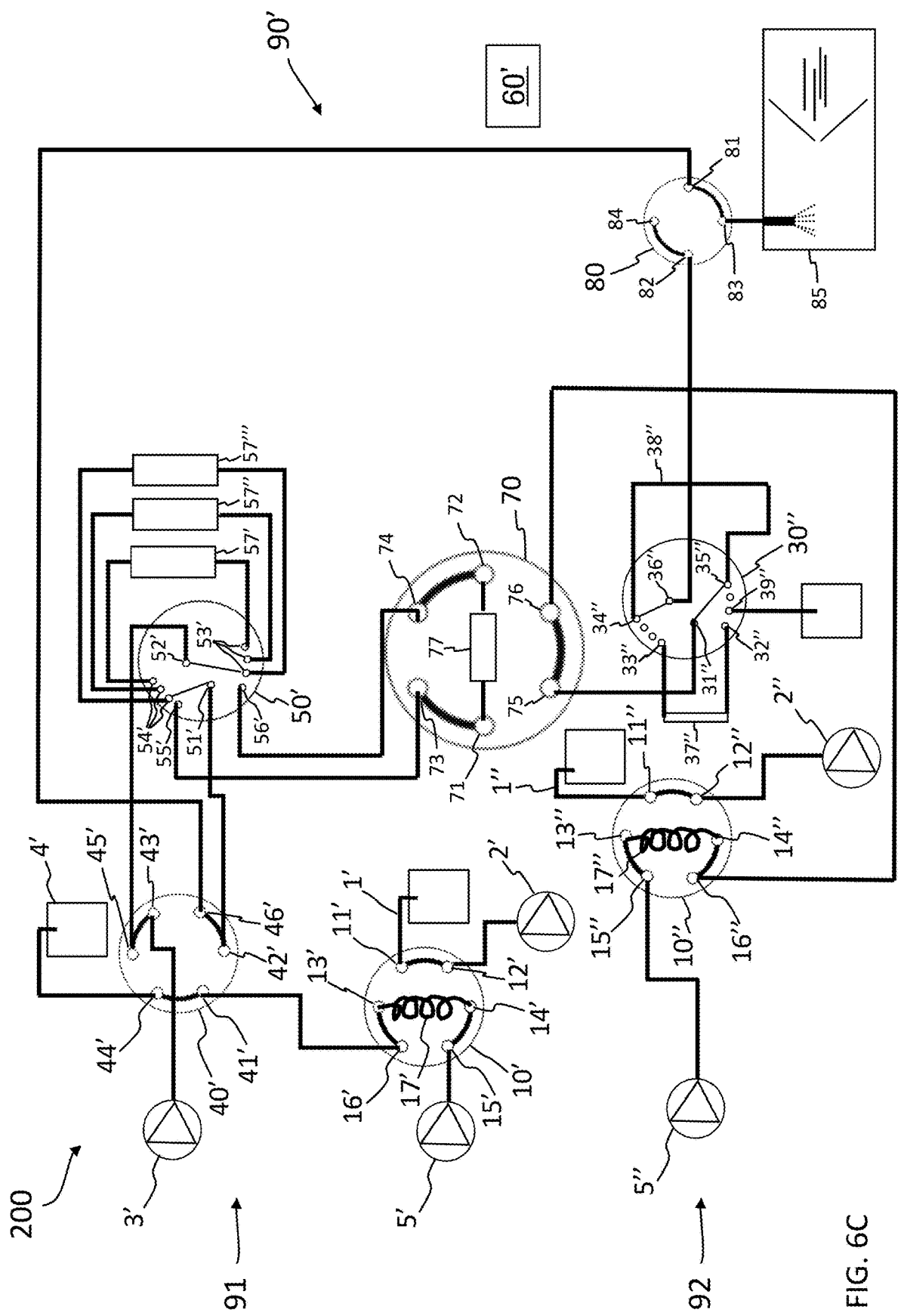
FIG. 6C shows schematically the same LC system of FIG. 6A in a third switch status of the same trap-elute mode.

FIG. 6C shows schematically the same LC system of FIG. 6A in a third switch status of the same trap-elute mode, in which the first sample-injection valve 10' is switched again such that the sample input port 11' is fluidically connected to the sample-loop-input port 13' and the sample-loop-output port 14' is fluidically connected to the aspiration/dispensing-pump port 12'. The LC pump 2' may be used to wash the sample input nozzle 1' and then aspirate a new sample. Also, the load-elute valve 40' is switched such that there is a direct fluidic connection between the trap column 57''' connected to the trap-selection valve 50' and onto which the sample was loaded and the substream-selection-analytical-output port 83 of the substream-selection valve 80 via the load-elute valve 40' and the substream-selection valve 80. In particular, there is a direct fluidic connection between the LC-pump port 43' of the load-elute valve 40' and a trap-column port 53' opposite to the trap-column port 54' through which the sample was loaded into the trap column 57''' so that the LC pump 3' can be activated for back-flushing and eluting the trapped sample up to the substream-selection-analytical-output port 83 of the substream-selection valve 80. At the same time the LC-pump port 15' of the first sample-injection valve 10' is connected to the sample-injection-to-load-elute port 16' so that the LC pump 5' may be used to wash another part of the fluidic path.

Analogously to the previous embodiment of the first LC system 100, this mode is called "trap-elute mode" because the sample is first trapped into a trap column 57''' and then eluted and transported directly to the analytical output by a mobile phase pumped by the LC pump 3' without passing through any other LC column.

FIG. 7A shows schematically the same LC system 200 of FIG. 5A in a first switch status of an LC mode, in which the second sample-injection valve 10" is switched such that the sample input port 11" is fluidically connected to the sample-loop-input port 13" and the sample-loop-output port 14" is fluidically connected to the aspiration/dispensing-pump port 12". Thus, the sample aspiration pump 2" can aspirate a sample through the sample input nozzle 1" into the sample loop 17". Also, the second sample-injection valve 10", the column-bypass valve 30", the trap-LC substream transfer valve 70 and the substream-selection valve 80 are switched such that there is a direct fluidic connection between the sample-injection-to-trap-LC-transfer port 16" of the second sample-injection valve 10" and the substream-selection-analytical-output port 83 of the substream-selection valve 80 via the trap-LC substream transfer valve 70 and an LC column 37" connected to the column-bypass valve 30".

Figure 7B:
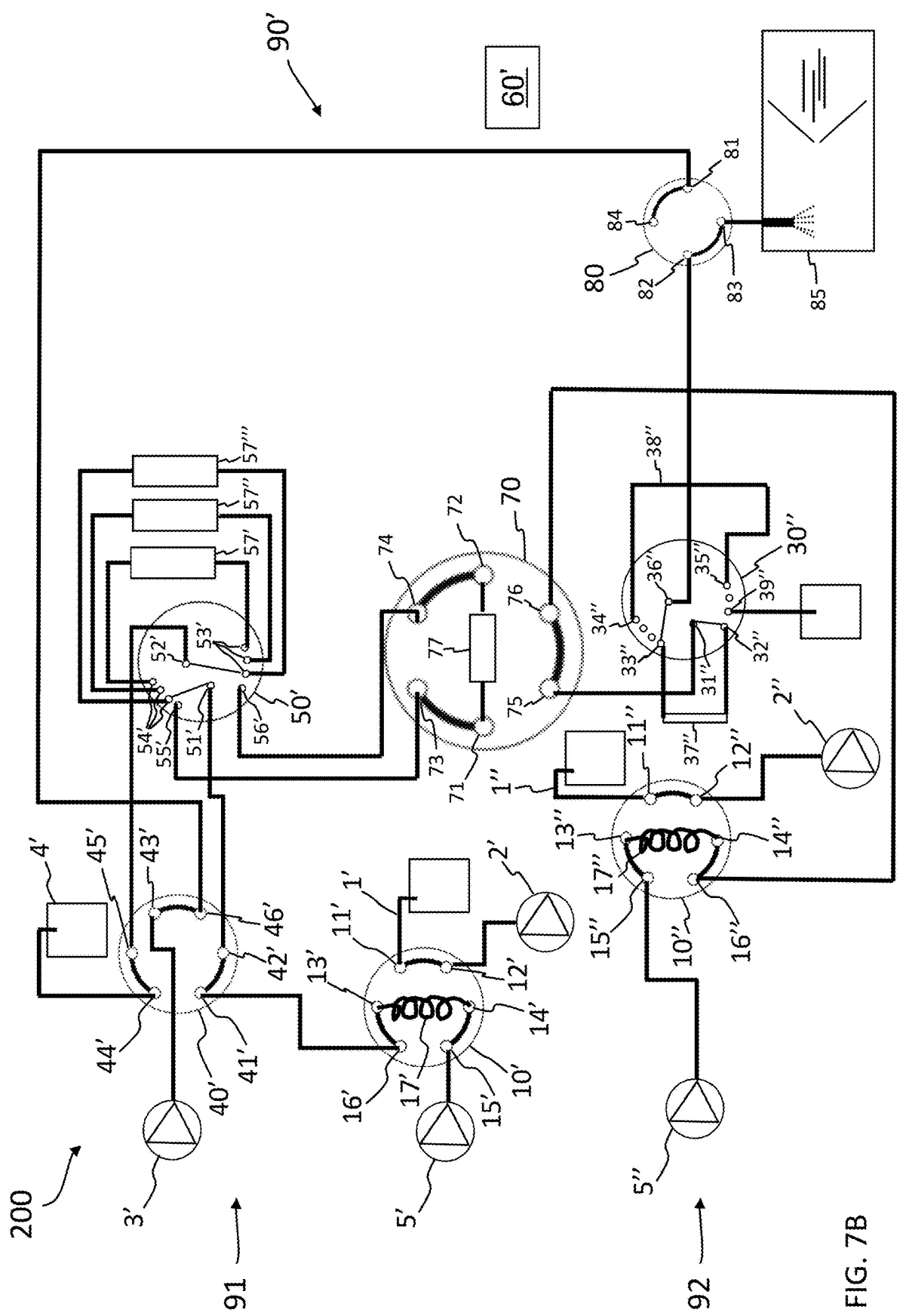
FIG. 7B shows schematically the same LC system of FIG. 7A in a second switch status of the same LC mode.

FIG. 7B shows schematically the same LC system 200 of FIG. 7A in a second switch status of the same LC mode, in which the second sample-injection valve 10" is switched such that the sample-loop-input port 13" and the sample-loop-output port 14" interconnected by the sample loop 17" are fluidically connected to the LC-pump port 15" and to the sample-injection-to-trap-LC-transfer port 16" respectively. In this way, the LC pump 5" can be activated for loading the sample aspirated into the sample loop 17" from the sample-injection-to-trap-LC-transfer port 16" of the second sample-injection valve 10" into the LC-column 37" connected to the column-bypass valve 30" and then eluting it through the substream-selection-analytical-output port 83 of the substream-selection valve 80.

Analogously to the previous embodiment of the first LC system 100, this mode is called "LC mode" because the sample is loaded into an LC column 37" and then eluted to the analytical output by a mobile phase pumped by the LC pump 5" without passing through a trap-column first.

Figure 8A:
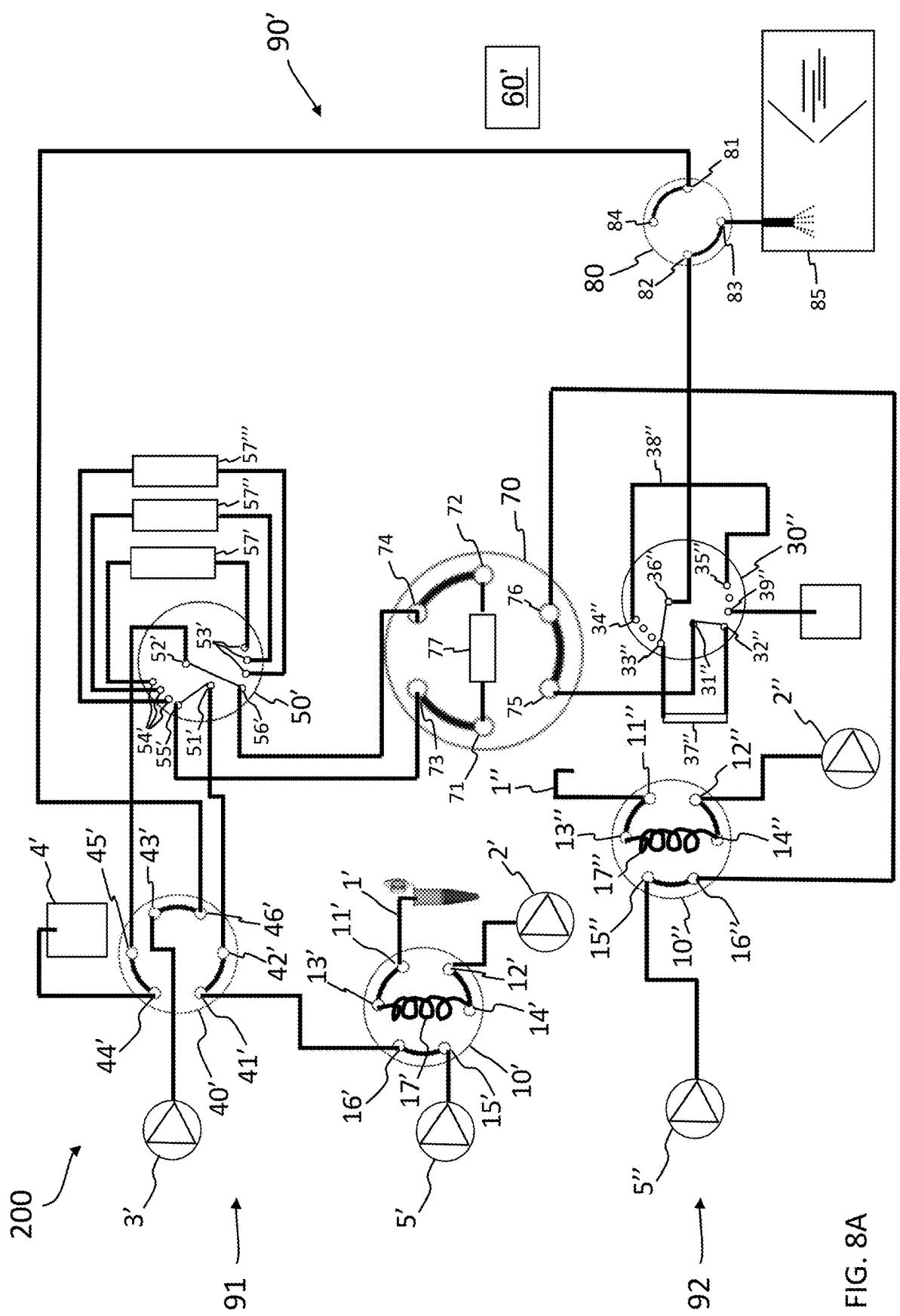
FIG. 8A shows schematically the same LC system of FIG. 5A in a first switch status of a trap-elute-LC mode.

FIG. 8A shows schematically the same LC system of FIG. 5A in a first switch status of a trap-elute-LC mode, in which the first sample-injection valve 10' is switched such that the sample input port 11' is fluidically connected to the sample-loop-input port 13' and the sample-loop-output port 14' is fluidically connected to the aspiration/dispensing-pump port 12'. Thus, the sample aspiration pump 2' can aspirate a sample through the sample input nozzle 1' into the sample loop 17'. Also, the first sample-injection valve 10', the load-elute valve 40', the trap-selection valve 50', the second sample-injection valve 10", the column-bypass valve 30", the trap-LC substream transfer valve 70, and the substream-selection valve 80 are switched such that there is a direct fluidic connection between the sample-injection-to-load-elute port 16' of the first sample-injection valve 10' and the waste port 44' of the load-elute valve 40' via the load-elute valve 40', the trap-selection valve 50', the trap-LC substream transfer valve 70 via the trap column 77, and again via the trap-selection valve 50' and the load-elute valve 40. Also, there is a direct fluidic connection between the LC-port 15" of the second sample-injection valve 10" and the substream-selection-analytical-output port 83 of the substream-selection valve 80 via the trap-LC substream transfer valve 70 and an LC column 37" connected to the column-bypass valve 30".

Figure 8B:
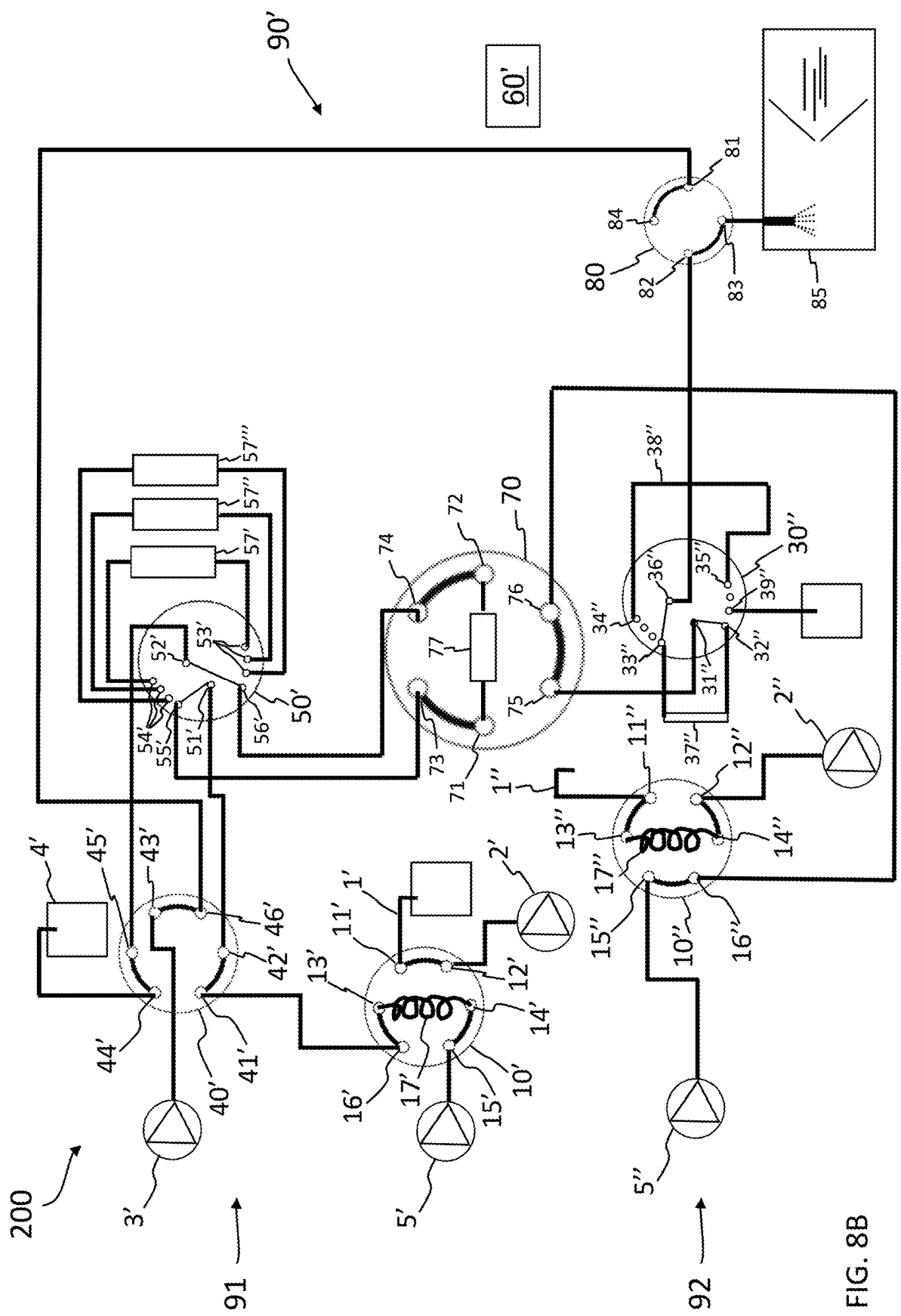
FIG. 8B shows schematically the same LC system of FIG. 8A in a second switch status of the same a trap-elute-LC mode.

FIG. 8B shows schematically the same LC system 200 of FIG. 8A in a second switch status of the same a trap-elute-LC mode, in which the first sample-injection valve 10' is switched such that the sample-loop-input port 13' and the sample-loop-output port 14' interconnected by the sample loop 17' are fluidically connected to the LC-pump port 15' and to the sample-injection-to-load-elute port 16' respectively. In this way, the LC pump 5' can be activated for loading the sample aspirated into the sample loop 17' from the sample-injection-to-load-elute port 16' of the first sample-injection valve 10' into the trap-column 77 connected to the trap-LC substream transfer valve 70.

Figure 8C:
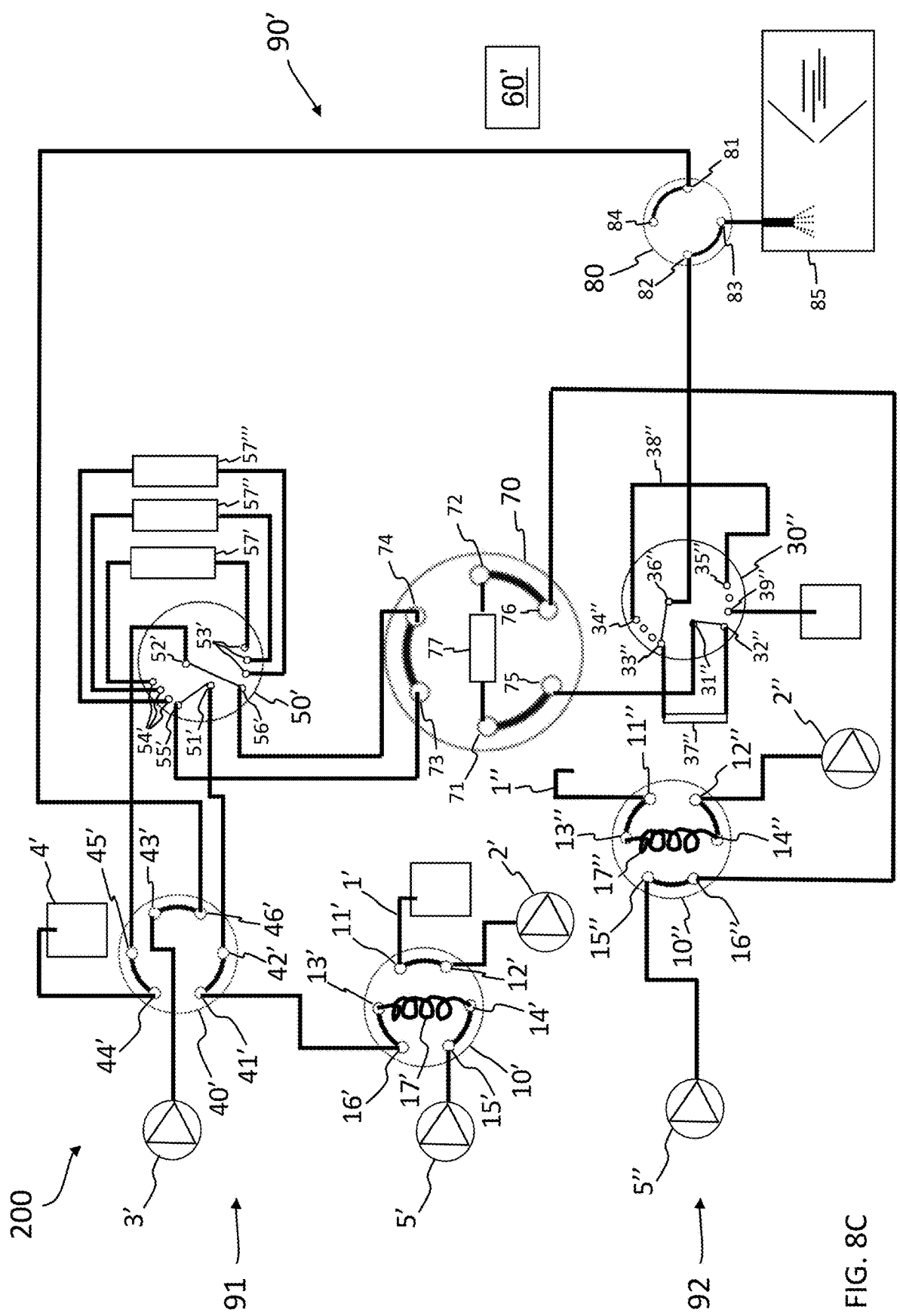
FIG. 8C shows schematically the same LC system of FIG. 8A in a third switch status of the same a trap-elute-LC mode.

FIG. 8C shows schematically the same LC system 200 of FIG. 8A in a third switch status of the same a trap-elute-LC mode, in which the first sample-injection valve 10' is switched again such that the sample input port 11' is fluidically connected to the sample-loop-input port 13' and the sample-loop-output port 14' is fluidically connected to the aspiration/dispensing-pump port 12'. Also, the trap-LC substream transfer valve 70 is switched such that there is a direct fluidic connection between the trap column 77 connected to the trap-LC substream transfer valve 70 and onto which the sample was loaded and the substream-selection-analytical-output port 83 of the substream-selection valve 80 via the trap-LC substream transfer valve 70 and an LC column 37" connected to the column-bypass valve 30".

In particular, there is a direct fluidic connection between the LC-pump port 15" of the of the second sample-injection valve 10" and the trap-column port 72 opposite to the trap-column port 71 through which the sample was loaded into the trap column 77 so that the LC pump 5" can be activated for back-flushing and eluting the trapped sample out of the trap column 77 for loading it into the LC column 37" connected to the column-bypass valve 30" and then eluting it through the substream-selection-analytical-output port 83 of the substream-selection valve 80.

At the same time the LC-pump port 15' of the first sample-injection valve 10' is connected to the sample-injection-to-load-elute port 16' so that the LC pump 5' may be used to wash another part of the fluidic path.

Analogously to the previous embodiment of the first LC system 100, this mode is called "trap-elute-LC mode" because the sample is first trapped into a trap column 77 connected to the trap-LC substream transfer valve 70 and then eluted and loaded into an LC column 37" connected to the column-bypass valve 30".

In the preceding specification, numerous specific details are set forth in order to provide a thorough understanding of the present disclosure. It will be apparent, however, to one having ordinary skill in the art that the specific detail need not be employed to practice the present teaching. In other instances, well-known materials or methods have not been described in detail in order to avoid obscuring the present disclosure.

Particularly, modifications and variations of the disclosed embodiments are certainly possible in light of the above description. It is therefore to be understood, that within the scope of the appended claims, the invention may be practiced otherwise than as specifically devised in the above examples.

Reference throughout the preceding specification to "one embodiment", "an embodiment", "one example" or "an example", means that a particular feature, structure or characteristic described in connection with the embodiment or example is included in at least one embodiment. Thus, appearances of the phrases "in one embodiment", "in an embodiment", "one example" or "an example", in various places throughout this specification are not necessarily all referring to the same embodiment or example.

Furthermore, the particular features, structures, or characteristics may be combined in any suitable combinations and/or sub-combinations in one or more embodiments or examples.

What is claimed is:

1. A liquid chromatographic (LC) system comprising at least one fluidic stream, the fluidic stream comprising:
    a sample-injection valve comprising a plurality of ports and a multi-way switch to switch fluidic connections between ports, including a sample input port fluidically connected to a sample input nozzle, an aspiration/dispensing-pump port fluidically connected to a sample aspiration pump, a sample-loop-input port and a sample-loop-output port interconnected by a sample loop, an LC-pump port fluidically connected to an LC pump and a sample-injection-to-trap-bypass-selection port;
    a trap-bypass-selection valve comprising a plurality of ports and a multi-way switch to switch fluidic connections between ports, including a trap-bypass-selection-to-sample-injection port fluidically connected to the sample-injection-to-trap-bypass-selection port of the sample injection valve, two bypass ports interconnected by a bypass fluidic path, a trap-bypass-selection-to-column-bypass port and two trap-bypass-selection-to-load-elute ports;
    a column-bypass valve comprising a plurality of ports and a multi-way switch to switch fluidic connections between ports, including a column-bypass-to-trap-bypass-selection port fluidically connected to the trap-bypass-selection-to-column-bypass port of the trap-bypass-selection valve, at least one pair of LC-columns ports interconnected by an LC analytical column, two bypass ports interconnected by a bypass fluidic path and an analytical output port;
    a load-elute valve comprising a plurality of ports and a multi-way switch to switch fluidic connections between ports, including two load-elute-to-trap-bypass-selection ports fluidically connected to the trap-bypass-selection-to-load-elute ports respectively of the trap-bypass-selection valve, an LC-pump port fluidically connected to an LC pump, a waste port fluidically connected to a waste, and two load-elute-to-trap-selection ports;
    a trap-selection valve comprising a plurality of ports and a multi-way switch to switch fluidic connections between ports, including two trap-selection-to-loadelute ports fluidically connected to the load-elute-to-trap-selection ports respectively of the load-elute valve, at least one pair of trap-column ports interconnected by a trap column.

2. The LC system according to claim 1 wherein the column-bypass valve is an LC-column selection valve to select between HPLC or UHPLC columns and comprising a plurality of pairs of LC-column ports, wherein each pair can be interconnected by a HPLC or UHPLC column and/or wherein the trap-selection valve is a trap-column selection valve to select between trap-columns and comprising a plurality of pairs of trap-column ports, wherein each pair can be interconnected by a trap-column.

3. The LC system according to claim 1 further comprising a controller configured to switch the sample-injection valve, the trap-bypass-selection valve, the column-bypass valve, the load-elute valve and the trap-selection valve of the same fluidic stream between any one of a continuous-flow-infusion/dilute-shoot mode, a trap-elute mode, an LC mode and a trap-elute-LC mode.

4. The LC system according to claim 3 wherein the continuous-flow-infusion/dilute-shoot mode comprises a switch status in which there is a direct fluidic connection between the sample-injection-to-trap-bypass-selection port of the sample-injection valve and the analytical output port of the column-bypass valve via the bypass fluidic path connected to the trap-bypass-selection valve and the bypass fluidic path connected to the column-bypass valve.

5. The LC system according to claim 3 wherein the trap-elute mode comprises a switch status in which there is a direct fluidic connection between a trap column connected to the trap-selection valve and the analytical output port of the column-bypass valve via the trap-selection valve, the load-elute valve and the bypass fluidic path connected to the column-bypass valve.

6. The LC system according to claim 3 wherein the LC mode comprises a switch status in which there is a direct fluidic connection between the sample-injection-to-trap-bypass-selection port of the sample-injection valve and the analytical output port of the column-bypass valve via the bypass fluidic path connected to the trap-bypass-selection valve and an LC column connected to the column-bypass valve.

7. The LC system according to claim 3 wherein the trap-elute-LC mode comprises a switch status in which there is a direct fluidic connection between a trap column connected to the trap-selection valve and the analytical output port of the column-bypass valve via the trap-selection valve, the load-elute valve, the trap-bypass-selection valve and an LC column connected to the column-bypass valve.

8. A liquid chromatographic (LC) system comprising at least one fluidic stream, the fluidic stream comprising a first substream and a second substream,
the first substream comprising:
a first sample-injection valve comprising a plurality of ports and a multi-way switch to switch fluidic connections between ports, including a sample input port fluidically connected to a sample input nozzle, an aspiration/dispensing-pump port fluidically connected to a sample aspiration pump, a sample-loop-input port and a sample-loop-output port interconnected by a sample loop, an LC-pump port fluidically connected to an LC pump and a sample-injection-to-load-elute port;
a load-elute valve comprising a plurality of ports and a multi-way switch to switch fluidic connections between ports, including a load-elute-to-sample-injection port fluidically connected to the sample-injection-to-load-elute port of the first sample-injection port, an LC-pump port fluidically connected to an LC pump, a waste port fluidically connected to a waste, an analytical output port and two load-elute-to-trap-selection ports;
a trap-selection valve comprising a plurality of ports and a multi-way switch to switch fluidic connections between ports, including two trap-selection-to-load-elute ports fluidically connected to the load-elute-to-trap-selection ports respectively of the load-elute valve, at least one pair of trap-column ports interconnected by a trap column, and two trap-selection-to-trap-LC-transfer ports;
the second substream comprising:
a second sample-injection valve comprising a plurality of ports and a multi-way switch to switch fluidic connections between ports, including a sample input port fluidically connected to a sample input nozzle, an aspiration/dispensing-pump port fluidically connected to a sample aspiration pump, a sample-loop-input port and a sample-loop-output port interconnected by a sample loop, an LC-pump port fluidically connected to an LC pump and a sample-injection-to-trap-LC-transfer port;
a column-bypass valve comprising a plurality of ports and a multi-way switch to switch fluidic connections between ports, including at least one pair of LC-columns ports interconnected by an LC analytical column, two bypass ports interconnected by a bypass fluidic path, an analytical output port, and a column-bypass-to-trap-LC-transfer port;
the fluidic stream further comprising:
a trap-LC substream transfer valve comprising a plurality of ports and a multi-way switch to switch fluidic connections between ports, including one pair of trap-column ports interconnected by a trap column, two trap-LC-transfer-to-trap-selection ports fluidically connected to the two trap-selection-to-trap-LC-transfer ports respectively of the trap-selection valve, a trap-LC-transfer-to-column-bypass port fluidically connected to the column-bypass-to-trap-LC-transfer port of the column-bypass valve and a trap-LC-transfer-to-sample-injection port fluidically connected to the sample-injection-to-trap-LC-transfer port of the second sample injection valve;
a substream-selection valve comprising a plurality of ports and a multi-way switch to switch fluidic connections between ports comprising a substream-selection-to-load-elute port fluidically connected to the analytical output port of the load-elute valve, a substream-selection-to-column-bypass port fluidically connected to the analytical output port of the column-bypass valve, and a substream-selection-analytical-output port.

9. The LC system according to claim 8 wherein the column-bypass valve is an LC-column selection valve to select between HPLC or UHPLC columns and comprising a plurality of pairs of LC-column ports, wherein each pair can be interconnected by a HPLC or UHPLC column and/or wherein the trap-selection valve is a trap-column selection valve to select between trap-columns and comprising a plurality of pairs of trap-column ports, wherein each pair can be interconnected by a trap-column.

10. The LC system according to claim 8 further comprising a controller configured to switch the first sample-injection valve, the load-elute valve, the trap-selection valve, the second sample-injection valve, the column-bypass valve, the trap-LC substream transfer valve and the substream-selection valve between any one of a continuous-flow-infusion/dilute-shoot mode, a trap-elute mode, an LC mode, a trap-elute-LC mode.

11. The LC system according to claim 10 wherein the continuous-flow-infusion/dilute-shoot mode comprises a switch status in which there is a direct fluidic connection between the sample-injection-to-trap-LC-transfer port of the second sample-injection valve and the substream-selection-analytical-output port of the substream-selection valve via the trap-LC substream transfer valve and the bypass fluidic path connected to the column-bypass valve.

12. The LC system according to claim 10 wherein the trap-elute mode comprises a switch status in which there is a direct fluidic connection between a trap column connected to the trap-selection valve and the substream-selection-analytical-output port of the substream-selection valve via the load-elute valve.

13. The LC system according to claim 10 wherein the LC mode comprises a switch status in which there is a direct fluidic connection between the sample-injection-to-trap-LC-transfer port of the second sample-injection valve and the substream-selection-analytical-output port of the substream-selection valve via the trap-LC substream transfer valve and via an LC column connected to the column-bypass valve.

14. The LC system according to claim 10 wherein the trap-elute-LC mode comprises a switch status in which there is a direct fluidic connection between the trap column connected to the trap-LC substream transfer valve and the substream-selection-analytical-output port of the substream-selection valve via an LC column connected to the column-bypass valve.

* * * * *